United States Patent
Her

(10) Patent No.: US 9,696,835 B2
(45) Date of Patent: Jul. 4, 2017

(54) ORGANIC LIGHT EMITTING DISPLAY DEVICE

(71) Applicant: Samsung Display Co., Ltd., Yongin (KR)

(72) Inventor: Yong-Koo Her, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 209 days.

(21) Appl. No.: 14/189,436

(22) Filed: Feb. 25, 2014

(65) Prior Publication Data

US 2015/0049030 A1 Feb. 19, 2015

(30) Foreign Application Priority Data

Aug. 19, 2013 (KR) .......................... 10-2013-0098087

(51) Int. Cl.
*G06F 3/041* (2006.01)
*G06F 3/044* (2006.01)
*G06F 3/046* (2006.01)

(52) U.S. Cl.
CPC ............ *G06F 3/0412* (2013.01); *G06F 3/044* (2013.01); *G06F 3/046* (2013.01); *G06F 2203/04103* (2013.01); *G06F 2203/04111* (2013.01)

(58) Field of Classification Search
CPC ......... G09G 3/30–3/3291; G06F 3/041–3/047; G06F 2203/04103; G06F 2203/04111
USPC .................. 345/76–83, 173–178; 315/169.3; 178/18.01–18.09, 18.11
See application file for complete search history.

(56) References Cited

U.S. PATENT DOCUMENTS

| | | | | |
|---|---|---|---|---|
| 2009/0033596 A1* | 2/2009 | Yoon | ...................... | G02F 1/1323 345/76 |
| 2011/0242027 A1* | 10/2011 | Chang | .................... | G06F 3/0412 345/173 |
| 2012/0038584 A1* | 2/2012 | Liu | ........................ | G06F 3/0416 345/174 |
| 2012/0062485 A1 | 3/2012 | Kim | | |
| 2012/0287506 A1 | 11/2012 | Yao et al. | | |
| 2013/0113734 A1* | 5/2013 | Cho | ........................ | G06F 3/044 345/173 |
| 2013/0335365 A1* | 12/2013 | Kim | ...................... | G06F 3/0412 345/174 |

(Continued)

FOREIGN PATENT DOCUMENTS

| | | |
|---|---|---|
| KR | 10-0209646 | 7/1999 |
| KR | 10-0215787 | 8/1999 |

(Continued)

*Primary Examiner* — Stephen Sherman
(74) *Attorney, Agent, or Firm* — H.C. Park & Associates, PLC

(57) ABSTRACT

An organic light emitting display device includes an organic light emitting display panel and touch electrodes directly disposed on the organic light emitting display panel. The organic light emitting display panel includes an organic light emitting device disposed in a light emitting area and a first light blocking layer disposed in a non-light emitting area. The touch electrodes are disposed on a sealing layer that covers the organic light emitting device. The touch electrodes are disposed to overlap with the non-light emitting area. At least one of the touch electrodes includes a conductive light blocking material.

19 Claims, 22 Drawing Sheets

(56) References Cited

U.S. PATENT DOCUMENTS

| | | | | |
|---|---|---|---|---|
| 2014/0160374 | A1* | 6/2014 | Wang | G06F 3/044 349/12 |
| 2014/0168161 | A1* | 6/2014 | Sugita | G06F 3/044 345/174 |
| 2014/0327654 | A1* | 11/2014 | Sugita | G06F 3/044 345/174 |
| 2014/0353691 | A1* | 12/2014 | Lee | H01L 27/323 257/88 |
| 2015/0060252 | A1* | 3/2015 | Wang | H03K 17/9622 200/5 R |
| 2015/0309644 | A1* | 10/2015 | Sun | G06F 3/0412 345/173 |

FOREIGN PATENT DOCUMENTS

| | | |
|---|---|---|
| KR | 10-0272514 | 11/2000 |
| KR | 10-2004-0001324 | 1/2004 |
| KR | 10-2005-0076464 | 7/2005 |
| KR | 10-0556374 | 3/2006 |
| KR | 10-2012-0042438 | 5/2012 |

* cited by examiner

ORGANIC LIGHT EMITTING DISPLAY DEVICE

CROSS-REFERENCE TO RELATED APPLICATION

This application claims priority from and the benefit of Korean Patent Application No. 10-2013-0098087, filed on Aug. 19, 2013, which is hereby incorporated by reference for all purposes as if fully set forth herein.

BACKGROUND

Field

Exemplary embodiments of the present invention relate to an organic light emitting display device. More particularly, Exemplary embodiments of the present invention relate to an organic light emitting display device capable of reducing a manufacturing cost and a thickness.

Discussion of the Background

Typically, an organic light emitting display (OLED) device includes an organic light emitting display panel and a driver to control the organic light emitting display panel. The organic light emitting display panel includes a plurality of pixels. Each pixel includes an organic light emitting device.

The organic light emitting device typically includes two electrodes and an organic light emitting layer disposed between the two electrodes. The two electrodes are configured to include an anode electrode and a cathode electrode, which are applied with different voltages. The organic light emitting device is usually protected by a sealing layer that may include a plurality of thin layers or a sealing substrate.

The organic light emitting display device typically includes a touch panel separated from the organic light emitting display panel configured to detect an external input.

SUMMARY

Exemplary embodiments of the present invention provide an organic light emitting display device including a touch panel.

Exemplary embodiments of present invention also provide an organic light emitting display device that includes an organic light emitting display panel and a touch panel disposed on the organic light emitting display panel. Touch electrodes of the touch panel are directly disposed on the organic light emitting display panel.

The organic light emitting display panel includes a base substrate, organic light emitting devices, a sealing layer, and a first light blocking layer. The base substrate includes light emitting areas and a non-light emitting area disposed adjacent to the light emitting areas. The organic light emitting devices are disposed to correspond respectively to the light emitting areas. The sealing layer covers the organic light emitting devices. The first light blocking layer is disposed on the sealing layer to overlap with the non-light emitting area.

The organic light emitting display panel also includes a touch panel. The touch panel includes first touch electrodes and second touch electrodes insulated from the first touch electrodes while crossing the first touch electrodes. The first touch electrodes receive scan signals. The second touch electrodes output sensing signals. The first touch electrodes and the second touch electrodes are disposed on the sealing layer to overlap with the non-light emitting area.

An exemplary embodiment of the present invention also discloses an organic light emitting display device including an organic light emitting display panel and a touch panel directly disposed on the organic light emitting display panel. Touch electrodes of the touch panel are directly disposed on the organic light emitting display panel.

The organic light emitting display panel includes a base substrate, organic light emitting devices, and a sealing layer. The base substrate includes light emitting areas and a non-light emitting area disposed adjacent to the light emitting areas. The organic light emitting devices are disposed to correspond respectively to the light emitting areas. The sealing layer covers the organic light emitting devices.

The organic light emitting display device also includes a touch panel. The touch panel includes first touch electrodes and second touch electrodes insulated from the first touch electrodes that cross the first touch electrodes. Scan signals and the second touch electrodes output sensing signals from the second touch electrodes are applied to the first touch electrodes. The first touch electrodes and the second touch electrodes are disposed on the sealing layer to overlap with the non-light emitting area.

According to the above, the touch panel is directly disposed on the organic light emitting display panel. That is, the first and second touch electrodes are directly formed on the sealing layer rather than the touch panel being separately manufactured and then attached to the organic light emitting display panel. Therefore, a manufacturing cost of the organic light emitting display device may be reduced and the thickness of the organic light emitting display device may be reduced.

When the touch panel is separately manufactured and attached to the organic light emitting display panel, the touch panel may be separated from the organic light emitting display panel by a bending stress when the organic light emitting display device is bent. However, when the first and second touch electrodes are directly formed on the sealing layer, the unit may endure the bending stress. Thus, the first and second touch electrodes may be prevented from being separated from the organic light emitting display panel even though the organic light emitting display panel is bent.

In addition, since the first and second touch electrodes are covered by the light blocking layer, they are not perceived by a user. Further, due to the first and second touch electrodes including the conductive light blocking material, a thickness of the touch panel may be reduced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
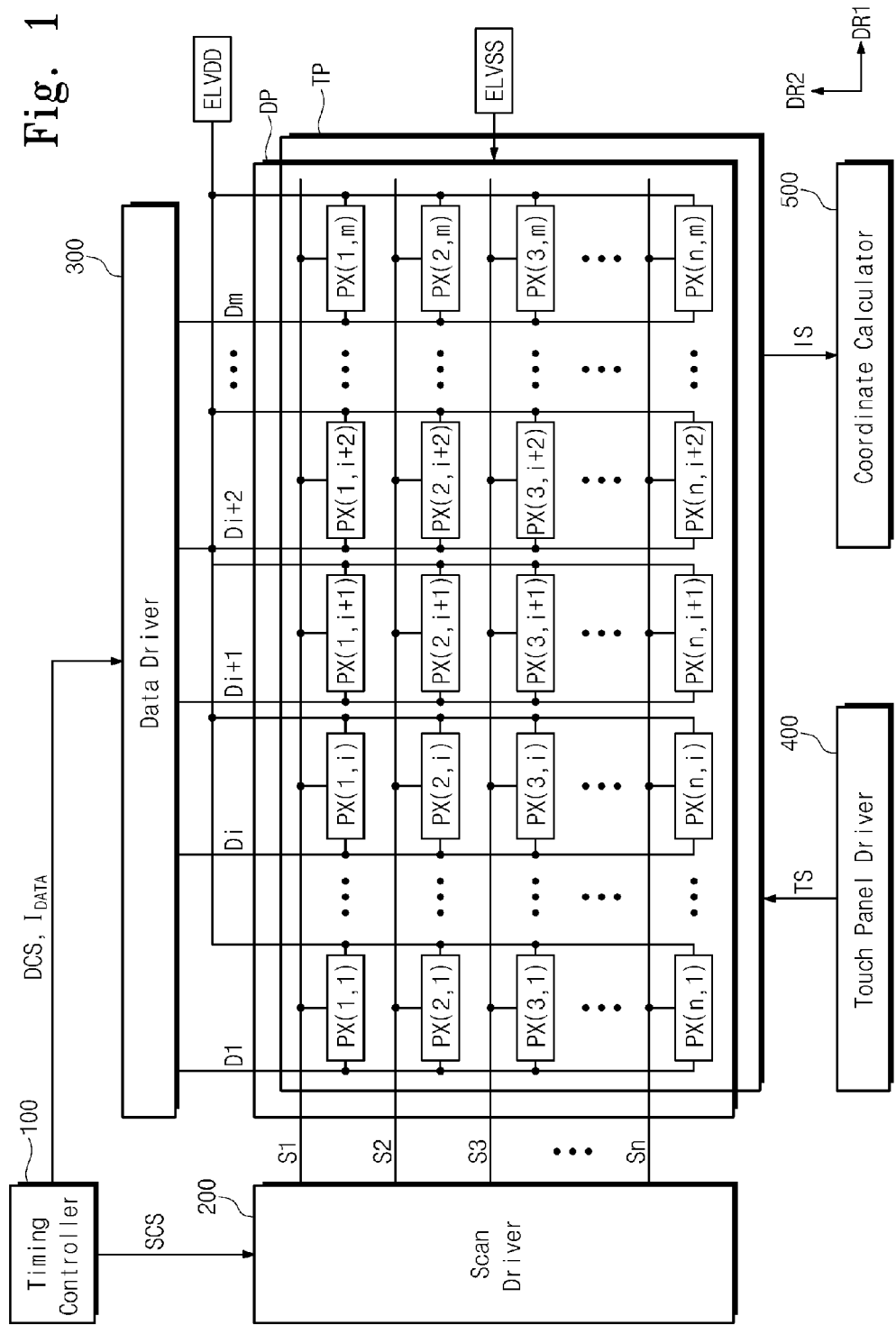
FIG. 1 is a block diagram showing an organic light emitting display device according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
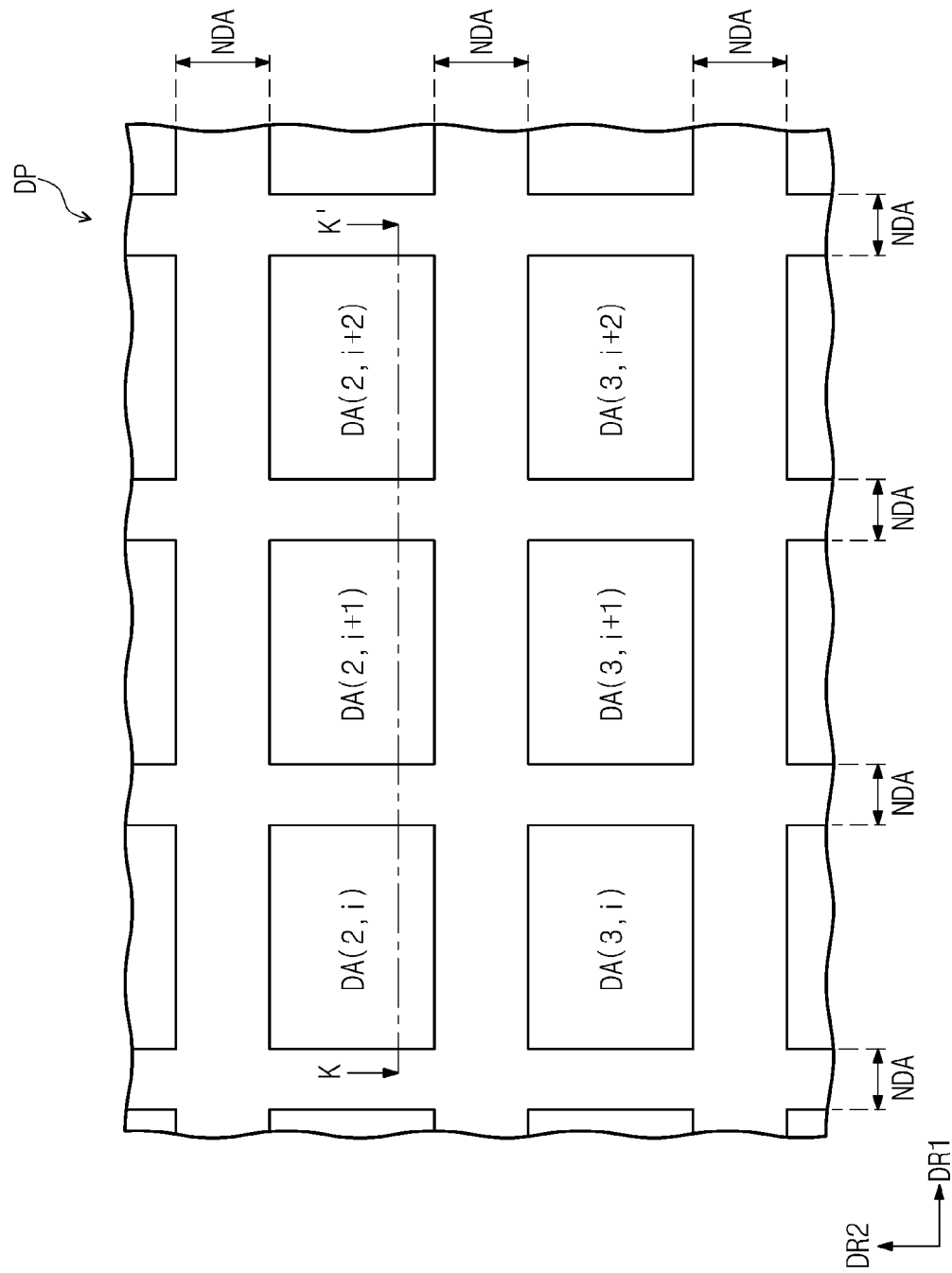
FIG. 2 a plan view showing a portion of an organic light emitting display panel according to an exemplary embodiment of the present invention.

FIG. 1 is a block diagram showing an organic light emitting display device according to an exemplary embodiment of the present disclosure. FIG. 2 is a plan view showing a portion of an organic light emitting display panel according to an exemplary embodiment of the present disclosure.

Referring to FIGS. 1 and 2, an organic light emitting display device (hereinafter referred to as display device) includes an organic light emitting display panel DP (hereinafter referred to as display panel), a touch panel TP, a timing controller 100, a scan driver 200, a data driver 300, a touch panel driver 400, and a coordinate calculator 500.

The display panel DP includes a base substrate (not shown), a plurality of scan lines S1 to Sn, a plurality of data lines D1 to Dm, and a plurality of pixels PX(1,1) to PX(n,m). Each pixel is connected to a corresponding scan line of the scan lines S1 to Sn and a corresponding data line of the data lines D1 to Dm.

The base substrate may include at least one of a glass substrate, a plastic substrate, and a stainless steel substrate, but is not limited thereto. A plastic substrate may be used as the base substrate for a flexible display panel.

The scan lines S1 to Sn are extended in a first direction DR1 on a surface of the base substrate and arranged in a second direction DR2 crossing the first direction DR1. The data lines D1 to Dm are insulated from the scan lines S1 to Sn while crossing the scan lines S1 to Sn. The data lines D1 to Dm are extended in the second direction DR2 and arranged in the first direction DR1.

The display panel DP receives a first source voltage ELVDD and a second source voltage ELVSS from an external source (not shown). The pixels PX(1,1) to PX(n,m) are turned on in response to corresponding scan signals, respectively. Each of the pixels PX(1,1) to PX(n,m) receives the first and second source voltages ELVDD and ELVSS and generates a light in response to a corresponding data signal.

Each of the pixels PX(1,1) to PX(n,m) may include at least one transistor, at least one capacitor, and an organic light emitting device. Each of the pixels PX(1,1) to PX(n,m) may have an equivalent circuit diagram as the circuit diagram of the pixel PX(3,i) shown in FIG. 3.

The timing controller 100 receives input image signals (not shown) and outputs image data $I_{DATA}$ suitable for an operation mode of the display panel DP and various control signals SCS and DCS.

The scan driver 200 receives a scan driving control signal SCS from the timing controller 100. The scan driver 200 generates the scan signals in response to the scan driving control signal SCS. The scan signals are sequentially applied to the scan lines S1 to Sn.

The data driver 300 receives a data driving control signal DCS and the image data $I_{DATA}$ from the timing controller 100. The data driver 300 generates the data signals based on the data driving control signal DCS and the image data $I_{DATA}$. The data signals are applied to the data lines D1 to Dm.

The touch panel TP is configured to sense external inputs. The touch panel TP is directly disposed on the display panel DP. The touch panel TP includes a plurality of first touch electrodes (not shown) and a plurality of second touch electrodes (not shown). In the present exemplary embodiment, the touch panel TP may be an electrostatic capacitive type touch panel, but is not limited thereto. That is, the touch panel TP may be, for example, an electromagnetic induction type touch panel.

The touch panel driver 400 applies scan signals TS to the touch panel TP. Either the first touch electrodes or the second touch electrodes receive the scan signals TS. The first touch electrodes or the second touch electrodes, which are applied with the scan signals TS, correspond to input electrodes of the electrostatic capacitive type touch panel.

The coordinate calculator 500 receives sensing signals IS from the other touch electrodes of the first touch electrodes and the second touch electrodes. The other touch electrodes, which output the sensing signals IS, correspond to output electrodes of the electrostatic capacitive type touch panel. The sensing signals IS have information about a variation of capacitance between the first touch electrodes and the second touch electrodes. The coordinate calculator 500 may calculate coordinate information of the external input on the basis of the levels of the sensing signals IS.

As shown in FIG. 2, the display panel DP includes a plurality of light emitting areas DA(2,i) to DA(3,i+2) and a non-light emitting area NDA surrounding the light emitting areas DA(2,i) to DA(3,i+2). FIG. 2 shows six light emitting areas DA(2,i) to DA(3,i+2) as an example.

The light emitting areas DA(2,i) to DA(3,i+2) are overlapped with the corresponding pixels PX(3,i) to PX(3,i+2) (refer to FIG. 1), respectively. Circuit parts CP of the pixels PX(2,i) to PX(3,i+2) are disposed in the non-light emitting area NDA. Scan lines S1 to Sn and the data lines D1 to Dm are disposed in the non-light emitting area NDA.

Figure 6:
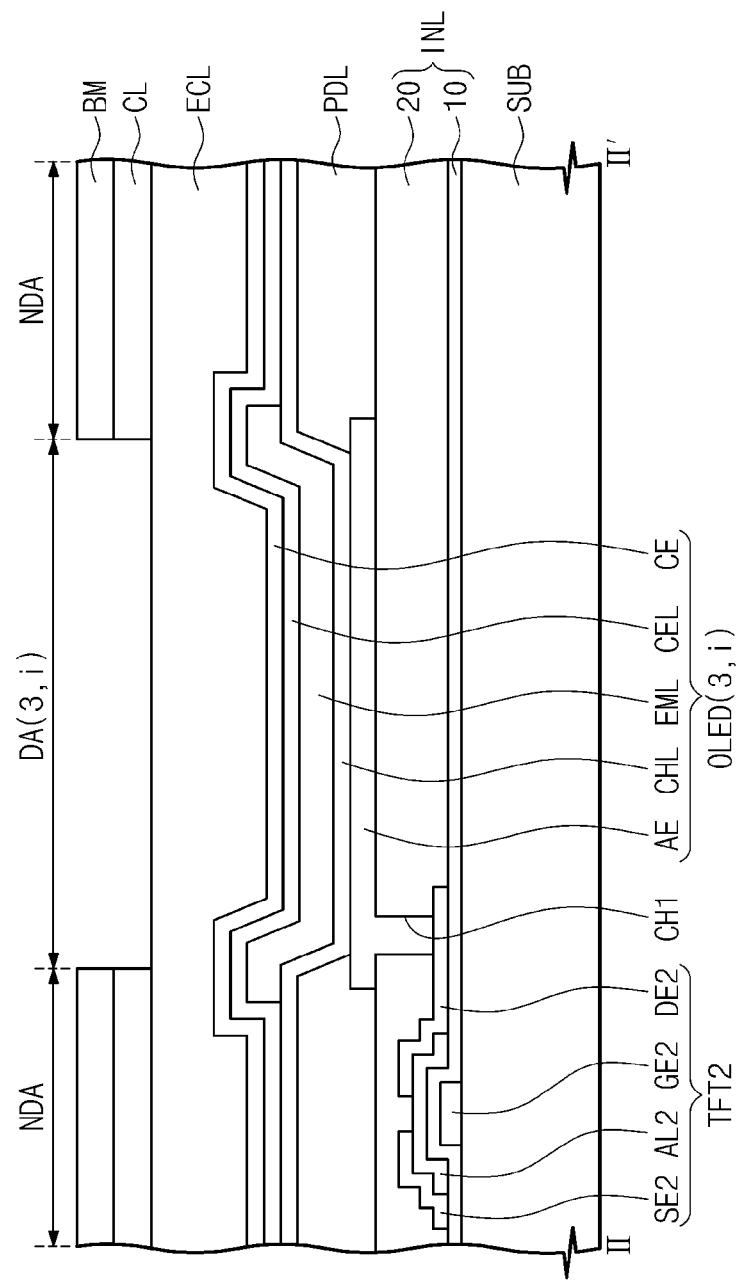
FIG. 6 is a cross-sectional view taken along a line II-II' of FIG. 4.

The light emitting areas DA(2,i) to DA(3,i+2) and the non-light emitting area NDA may be defined by a pixel definition layer PDL (refer to FIG. 6). The pixel definition layer PDL is disposed in the non-light emitting area NDA, and the light emitting areas DA(2,i) to DA(3,i+2) correspond to areas in which the organic light emitting devices of the pixels PX(2,i) to PX(3,i+2) are exposed through openings formed through the pixel definition layer PDL.

Figure 3:
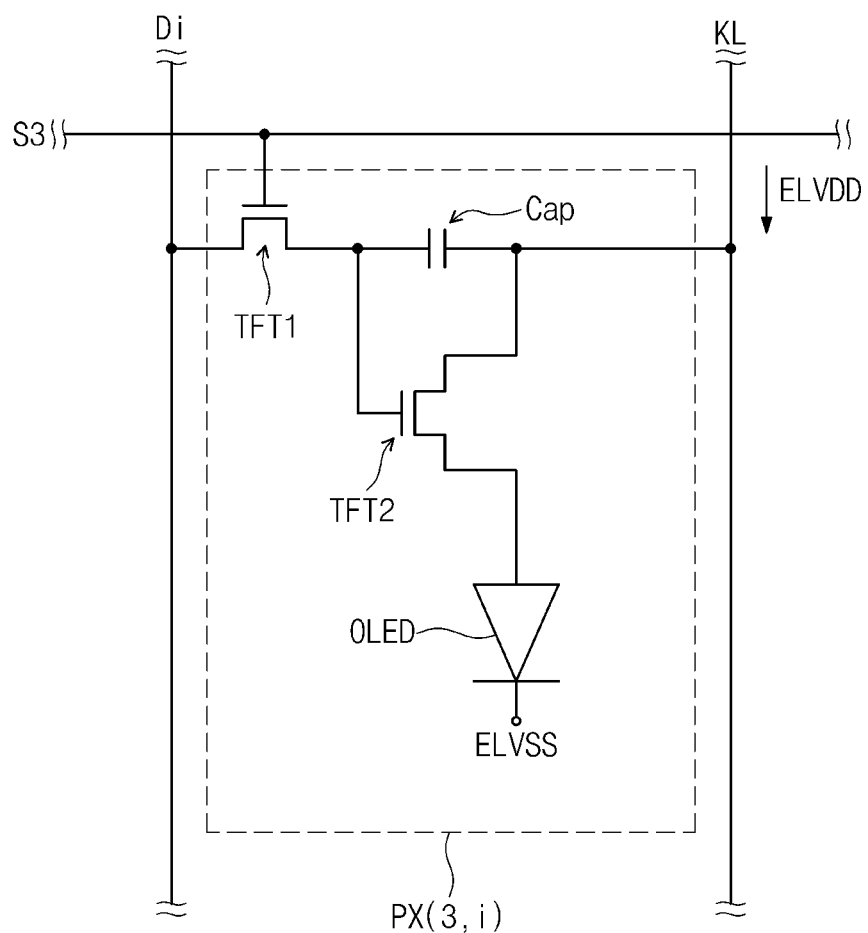
FIG. 3 is an equivalent circuit diagram of a pixel according to an exemplary embodiment of the present invention.
Figure 4:
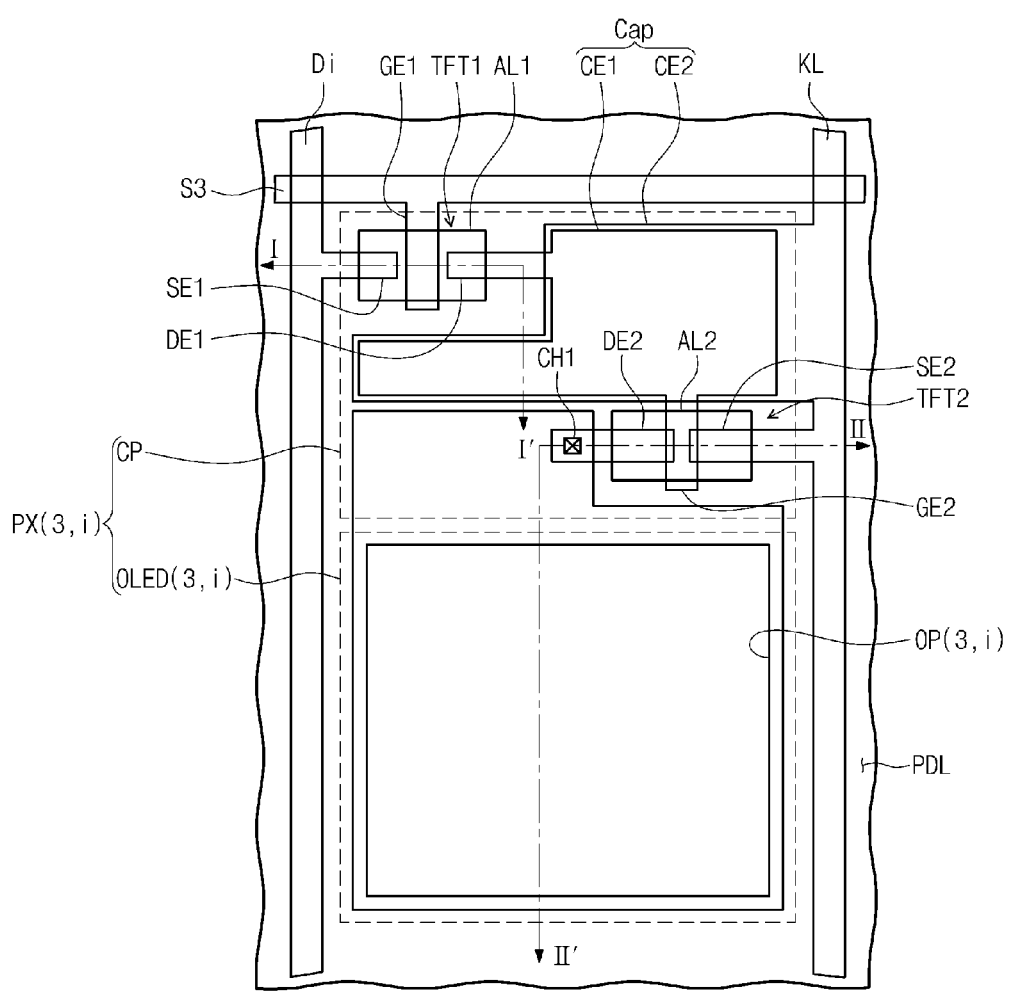
FIG. 4 is a layout diagram showing a pixel according to an exemplary embodiment of the present invention.
Figure 5:
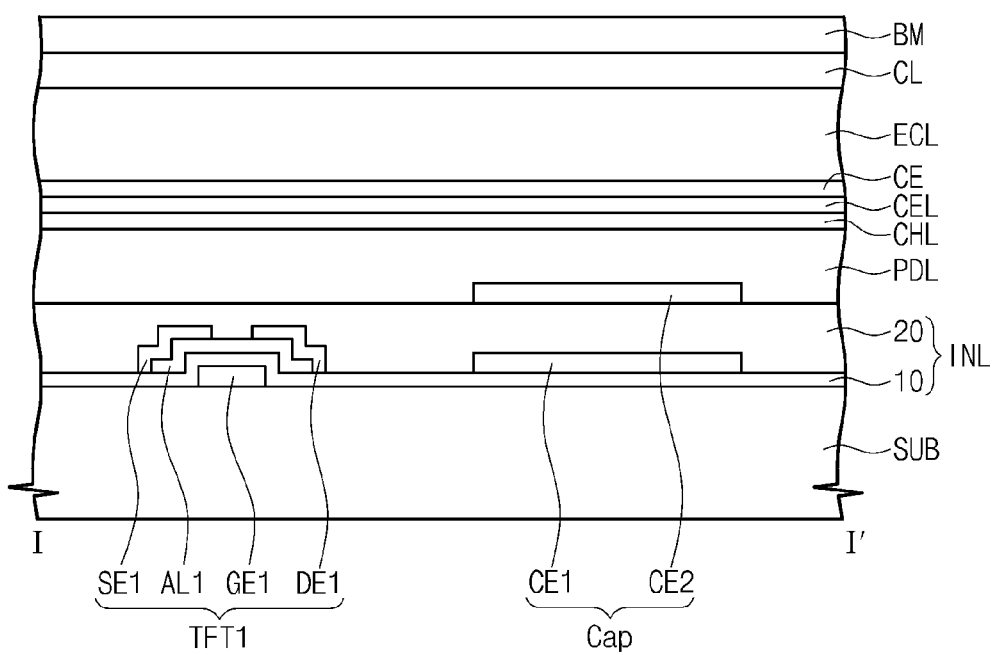
FIG. 5 is a cross-sectional view taken along a line I-I' of FIG. 4.

FIG. 3 is an equivalent circuit diagram of a pixel according to an exemplary embodiment of the present disclosure. FIG. 4 is a layout diagram showing a pixel according to an exemplary embodiment of the present disclosure. FIG. 5 is a cross-sectional view taken along a line I-I' of FIG. 4. FIG. 6 is a cross-sectional view taken along a line II-II' of FIG. 4. In FIG. 4, a portion of the organic light emitting device and some layers on the display panel have been omitted for clarity.

Referring to FIG. 3, the pixel PX(3,i) includes a first transistor TFT1, a second transistor TFT2, a capacitor Cap, and the organic light emitting device OLED(3,i). The first transistor TFT1 includes a control electrode connected to the third scan line S3, an input electrode connected to the i-th data line Di, and an output electrode. The first transistor TFT1 outputs the data signal applied to the i-th data line Di in response to the scan line applied to the third scan line S3.

The capacitor Cap includes a first electrode connected to the first transistor TFT1 and a second electrode applied with the first source voltage ELVDD. The first source voltage ELVDD has a magnitude higher than that of the second source voltage ELVSS. The capacitor Cap may be charged with an amount of electric charge corresponding to a difference between the data signal provided from the first transistor TFT1 and the first source voltage ELVDD.

The second transistor TFT2 includes a control electrode connected to the output electrode of the first transistor TFT1 and the first electrode of the capacitor Cap, an input electrode applied with the first source voltage ELVDD, and an output electrode. The output electrode of the second transistor TFT2 is connected to the organic light emitting device OLED(3,i). The second transistor TFT2 is configured to control a driving current flowing through the organic light emitting device OLED(3,i) in response to the amount of the electric charge charged in the capacitor Cap.

The organic light emitting device OLED(3,i) includes a first electrode (not shown) connected to the second transistor TFT2 and a second electrode (not shown) applied with the second source voltage ELVSS. In addition, the organic light emitting device OLED includes an organic light emitting layer OLED(3,i) disposed between the first electrode and the second electrode. The organic light emitting device OLED(3,i) emits the light during a turned-on period of the second transistor TFT2.

Referring to FIG. 4, the third scan line S3 and the i-th data line Di are disposed on the base substrate SUB and are insulated from each other. In addition, a source voltage line KL is disposed on the base substrate SUB and is configured to receive the first source voltage ELVDD. The source voltage line KL may be disposed on the same layer as the i-th data line Di.

The pixel PX(3,i) is divided into the organic light emitting device OLED(3,i) and the circuit part CP. The circuit part CP includes the first transistor TFT1, the second transistor TFT2, and the capacitor Cap. When viewed in a plan view, the organic light emitting device OLED(3,i) overlaps with the opening OP(3,i) formed in the pixel definition layer PDL. The circuit CP overlaps with the pixel definition layer PDL.

Referring to FIGS. 4 and 5, the control electrode GE1 (hereinafter, referred to as first control electrode) of the first transistor TFT1 is branched from the third scan line S3. A first insulating layer 10 is disposed on the base substrate SUB to cover the third scan line S3. The first insulating layer 10 may include an organic layer and/or an inorganic layer.

A semiconductor layer AL1 (hereinafter referred to as first semiconductor layer) of the first transistor TFT1 is disposed on the first control electrode GE1. The first insulating layer 10 is disposed between the first transistor TFT1 and control electrode GE1. The input electrode SE1 (hereinafter referred to as first input electrode) and the output electrode DE1 (hereinafter, referred to as first output electrode) of the first transistor TFT1 are disposed to overlap with the first semiconductor layer AL1. The first input electrode SE1 and the second output electrode DE1 are spaced apart from each other. In FIGS. 4 and 5, the first transistor TFT1 has a bottom gate structure, but it should not be limited thereto or thereby. That is, the first transistor TFT1 may have, for example, a top gate structure.

The first electrode CE1 of the capacitor Cap is disposed on the first insulating layer 10. The first electrode CE1 of the capacitor Cap is connected to the first output electrode DE1. A second insulating layer 20 is disposed on the first insulating layer 10 to cover the first input electrode SE1, the first output electrode DE1, and the first electrode CE1 of the capacitor Cap. The second electrode CE2 of the capacitor Cap is disposed on the second insulating layer 20. The second electrode CE is connected to the source voltage line KL.

As shown in FIGS. 4 and 6, the control electrode GE2 (hereinafter referred to as second control electrode) of the second transistor TFT2 is connected to the first electrode CE1 of the capacitor Cap. A semiconductor layer AL2 (hereinafter referred to as second semiconductor layer) of the second transistor TFT2 is disposed on the second control electrode GE2 while interposing the first insulating layer 10 therebetween. The input electrode SE2 (hereinafter referred to as second input electrode) and the output electrode DE2 (hereinafter referred to as second output electrode) of the second transistor TFT2 overlap the second semiconductor layer AL2. The second insulating layer 20 covers the second input electrode SE2 and the second output electrode DE2. Although FIGS. 4 and 6, show TFT2 having a bottom gate structure, the second transistor TFT2 may have, for example, a top gate structure.

As shown in FIGS. 5 and 6, the organic light emitting device OLED(3,i) is disposed on the second insulating layer 20. The organic light emitting device OLED(3,i) includes a first electrode AE, a first common layer CHL, an organic light emitting layer EML, a second common layer CEL, and a second electrode CE, which are sequentially stacked on the second insulating layer 20. The first electrode AE is connected to the second output electrode DE2 through a contact hole CH1 (refer to FIG. 4) formed in the second insulating layer 20.

The first common layer CHL includes at least a hole injection layer and the second common layer CEL includes at least an electron injection layer. The first common layer CHL may further include a hole transport layer disposed between the hole injection layer and the organic light emitting layer EML and the second common layer CEL further includes an electron transport layer disposed between the electron injection layer and the organic light emitting layer EML.

A sealing layer ECL is disposed on the base substrate SUB, covering the organic light emitting device OLED(3,i). The sealing layer ECL is disposed on the entire of the base substrate SUB. For instance, the sealing layer ECL overlaps with the light emitting areas DA(2,i) to DA(3, i+2) and the non-light emitting area NDA surrounding the light emitting areas DA(2,i) to DA(3, i+2) shown in FIG. 2. In other words, the sealing layer ECL may cover all the light emitting devices disposed in the light emitting areas DA(2,i) to DA(3,i+2).

At least one conductive layer CL and at least one light blocking layer BM are disposed on the sealing layer ECL. The conductive layer CL forms the first touch electrodes and/or the second touch electrodes of the touch panel TP. The conductive layer CL overlaps the non-light emitting area NDA in order to improve an aperture ratio of the touch panel TP.

The light blocking layer BM overlaps the non-light emitting area NDA. The light blocking layer BM prevents a light, which is incident to the sealing layer ECL from the upper portion of the sealing layer ECL, from being reflected by the sealing layer ECL. The light blocking layer BM absorbs the light from the upper portion of the sealing layer ECL, and thus, visibility of the display device may be improved.

Figure 7:
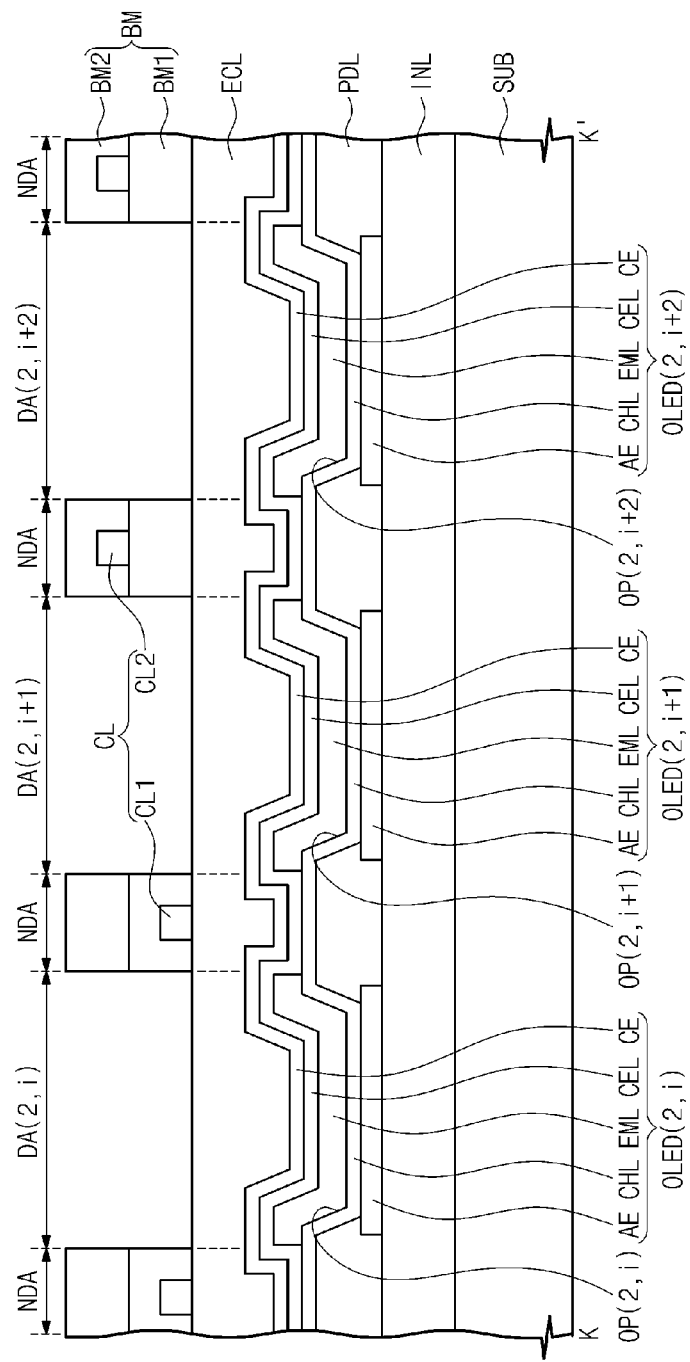
FIG. 7 is a cross-sectional view taken along a line K-K' of FIG. 2.

FIG. 7 is a cross-sectional view taken along a line K-K' of FIG. 2. In detail, FIG. 7 shows three successive light emitting areas DA(2,i) to DA(2,i+2) arranged in the first direction DR1 (hereinafter, referred to as first, second, and third light emitting areas). In FIG. 7, the structure under the pixel definition layer PDL has been simplified for clarity. Hereinafter, the conductive layer CL and the light blocking layer BM, which are disposed on the sealing layer ECL, will be described in detail with reference to FIG. 7.

Referring to FIG. 7, the organic light emitting devices OLED(2,i) to OLED(2,i+2) (hereinafter, referred to as first, second, and third organic light emitting devices) are respectively disposed in the first to third light emitting areas DA(2,i) to DA(2,i+2) and generate lights having different colors. For instance, the first to third organic light emitting devices OLED(2,i) to (2,i+2) may generate a red light, a green light, and a blue light, respectively.

The display panel DP may further include a fourth pixel disposed adjacent to the first to third pixels PX(2,i) to PX(2,i+2) to generate a different color, e.g., a white color. Further, the first to third organic light emitting devices OLED(2,i) to OLED(2,i+2) may generate the white color.

The conductive layer CL includes a first conductive layer CL1 and a second conductive layer CL2, which are disposed on different layers. The first conductive layer CL1 may be directly disposed on the sealing layer ECL. The first conductive layer CL1 may overlap a portion of the non-light emitting area NDA. The first conductive layer CL1 may form one of the first touch electrodes and the second touch electrodes.

The light blocking layer BM includes a first light blocking layer BM1 and a second light blocking layer BM2, which are disposed on different layers. The first light blocking layer BM1 is disposed on the sealing layer ECL and covers at least the first conductive layer CL1. The first light blocking layer BM1 absorbs the external light incident to the first conductive layer CL1. The first conductive layer CL1 may be disposed on the entire of the non-light emitting area NDA.

The second conductive layer CL2 is disposed on the first light blocking layer BL1. The second conductive layer CL2 may include the other one of the first touch electrodes and the second touch electrodes. The second conductive layer CL2 may overlap a portion of the non-light emitting area NDA. The second conductive layer CL2 may not overlap the first conductive layer CL1.

The second light blocking layer BM2 is disposed on the first light blocking layer BM1 to cover the second conductive layer CL2. The second light blocking layer BM2 absorbs the external light incident to the second conductive layer CL2. The second light blocking layer BM2 may overlap the entire of the non-light emitting area NDA. The second light blocking layer BM2 may have various shapes when viewed in a plan view as long as the second light blocking layer BM2 overlaps the second conductive layer CL2.

Figure 8:
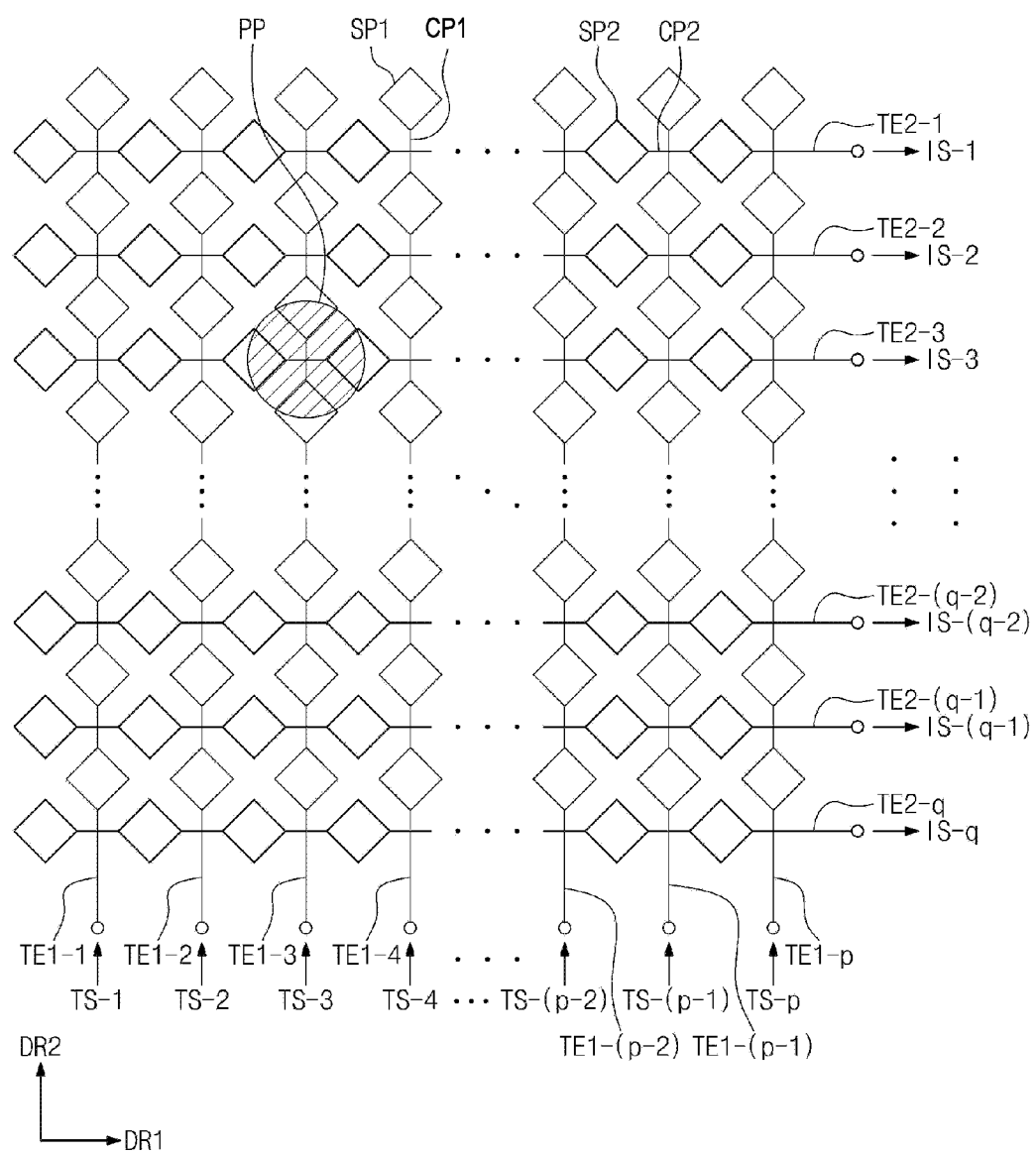
FIG. 8 is a plan view showing a touch panel according to an exemplary embodiment of the present invention.
Figure 9:
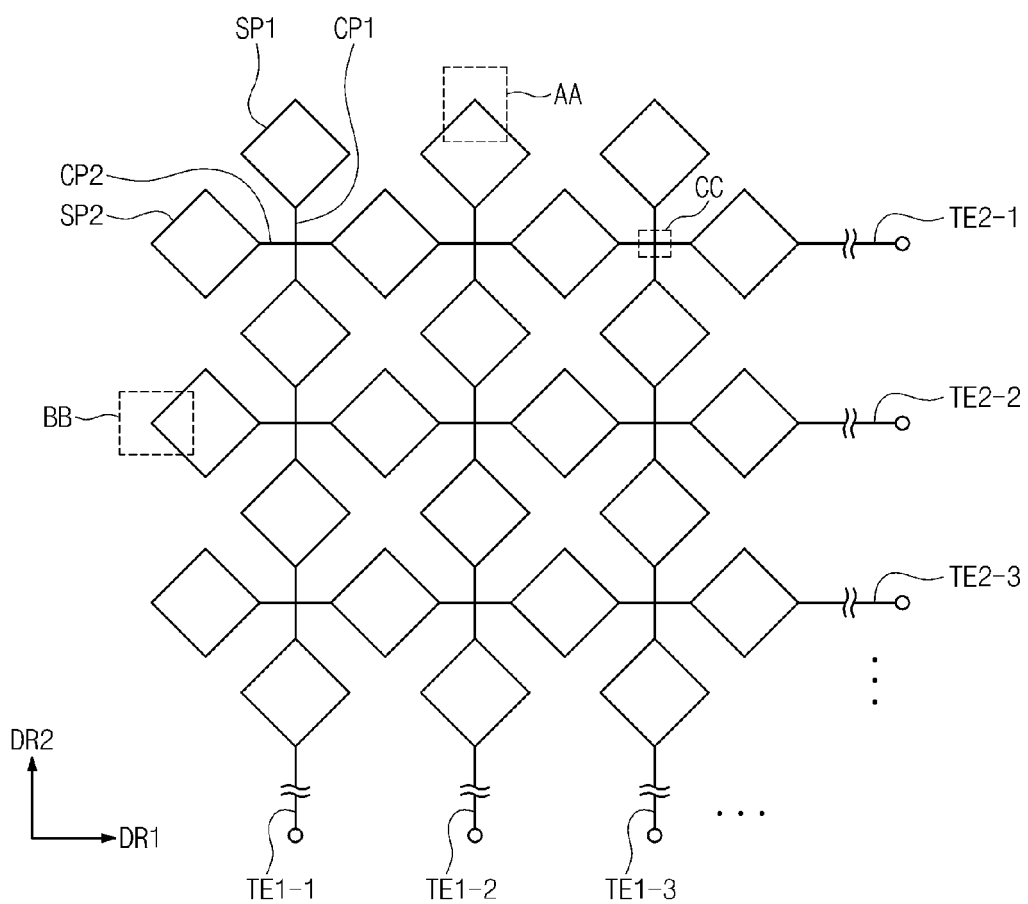
FIG. 9 is an enlarged plan view showing a portion of the touch panel shown in FIG. 8.

FIG. 8 is a plan view showing a touch panel according to an exemplary embodiment of the present disclosure and FIG. 9 is an enlarged plan view showing a portion of the touch panel shown in FIG. 8. FIG. 8 shows only the first touch electrodes TE1-1 to TE1-$p$ and the second touch electrodes TE2-1 to TE2-$q$, and the light blocking layer is omitted for clarity.

Referring to FIG. 8, the first touch electrodes TE1-1 to TE1-$p$ are arranged in the first direction DR1. Each of the first touch electrodes TE1-1 to TE1-$p$ extends in the second direction DR2. The second touch electrodes TE2-1 to TE2-$q$ are arranged in the second direction DR2 and extend in the first direction DR1.

Each of the first touch electrodes TE1-1 to TE1-$p$ includes a plurality of sensor parts SP1 (hereinafter, referred to as first sensor parts) and a plurality of connection parts CP1 (hereinafter, referred to as first connection parts). The first sensor parts SP1 are arranged in the second direction DR2. Each of the first connection parts CP1 connects two adjacent first sensor parts of the first sensor parts SP1.

Each of the second touch electrodes TE2-1 to TE2-$q$ includes a plurality of sensor parts SP2 (hereinafter, referred to as second sensor parts) and a plurality of connection parts CP2 (hereinafter, referred to as second connection parts). The second sensor parts SP2 are arranged in the first direction DR1. Each of the second connection parts CP2 connects two adjacent second sensor parts of the second sensor parts SP2.

Each of the first sensor parts SP1 has a lozenge shape and each of the first connection parts CP1 has a line shape. Each of the first connection parts CP1 connects vertices of the two adjacent first sensor parts. The first sensor parts SP1 having the lozenge shape may have an area larger than that of the first connection part CP1.

The first touch electrodes TE1-1 to TE1-$p$ are capacitively coupled to the second touch electrodes TE2-1 to TE2-$q$. When the scan signals TS-1 to TS-p are applied to the first touch electrodes TE1-1 to TE1-$p$, capacitors are formed between the first sensor parts SP1 and the second sensor parts SP2.

According to a mutual capacitance scheme, the first touch electrodes TE1-1 to TE1-$p$ may sequentially receive the scan signals TS-1 to TS-p activated in different periods by the touch panel driver 400 (refer to FIG. 1). The second touch electrodes TE2-1 to TE2-$q$ output the sensing signals IS-1 to IS-q generated from the scan signals TS-1 to TS-p.

When assuming that an area in which a third touch electrode TE1-3 of the first touch electrodes TE1-1 to TE1-$p$ crosses a third touch electrode TE2-3 of the second touch electrodes TE2-1 to TE2-$q$ is an input point PP, the input point PP is generated by an input device, for example, a finger of a user.

The sensing signal IS-3 output from the third touch electrode TE2-3 of the second touch electrodes TE2-1 to TE2-$q$ has a magnitude different from that of the sensing signals IS-1, IS-2, and IS-4 to IS-q output from other second touch electrodes TE2-1, TE2-2, and TE2-3 to TE2-$q$.

The coordinate calculator 500 (refer to FIG. 1) calculates the coordinate information in the first direction DR1 of the input point PP on the basis of the time at which the sensing signal IS-3 having the different magnitude is sensed. In addition, the coordinate calculator 500 calculates the coordinate information in the second direction DR2 of the input point PP on the basis of a relative position of the third touch electrode TE2-3 with respect to the second touch electrodes TE2-1 to TE2-$q$.

The coordinate calculator 500 may include an amplifier, a noise filter, and an analog-to-digital converter. The amplifier may amplify the sensing signals IS-1 to IS-q. The noise filter may remove noises in the amplified sensing signals IS-1 to IS-q. The analog-to-digital converter may convert the sensing signals IS-1 to IS-q, from which the noises are removes, to digital signals. The coordinate information of the input point PP may be calculated from the digital signals.

The first touch electrodes TE1-1 to TE1-$p$ may be disposed on a different layer from the second touch electrodes TE2-1 to TE2-$q$. The first touch electrodes TE1-1 to TE1-$p$ may include the first conductive layer CL1 shown in FIG. 7. The second touch electrodes TE2-1 to TE2-$q$ may include the second conductive layer CL2 shown in FIG. 2. Consequently, the first touch electrodes TE1-1 to TE1-$p$ and the second touch electrodes TE2-1 to TE2-$q$ are disposed on different layers from each other while interposing the first light blocking layer BM1 between the first touch electrodes TE1-1 to TE1-$p$ and the second touch electrodes TE2-1 to TE2-$q$.

Hereinafter, the first touch electrodes TE1-1 to TE1-$p$ and the second touch electrodes TE2-1 to TE2-$q$ will be described in detail with reference to FIGS. 9 to 15.

Figure 10:
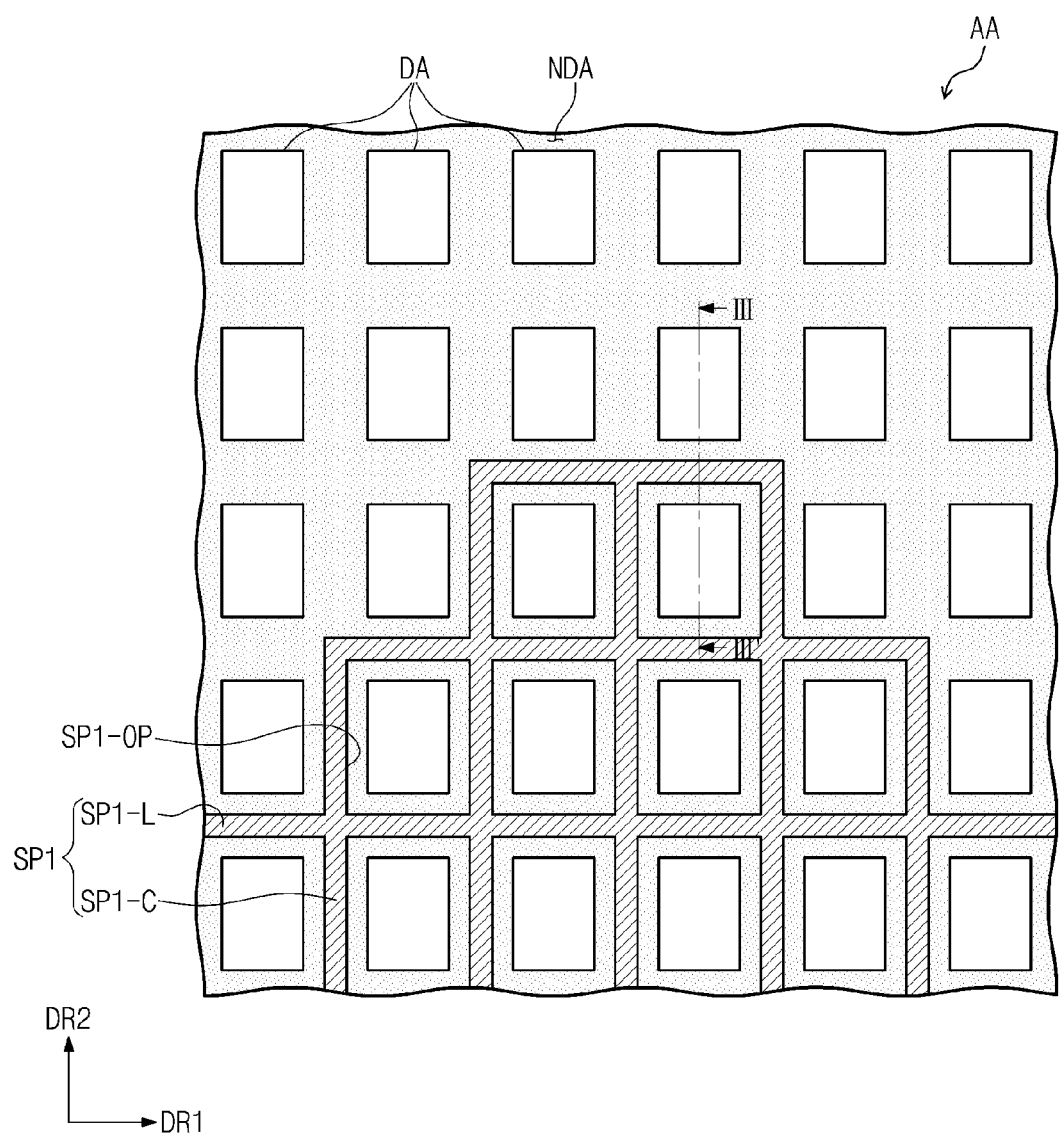
FIG. 10 is an enlarged plan view showing a portion AA of FIG. 9.
Figure 11:
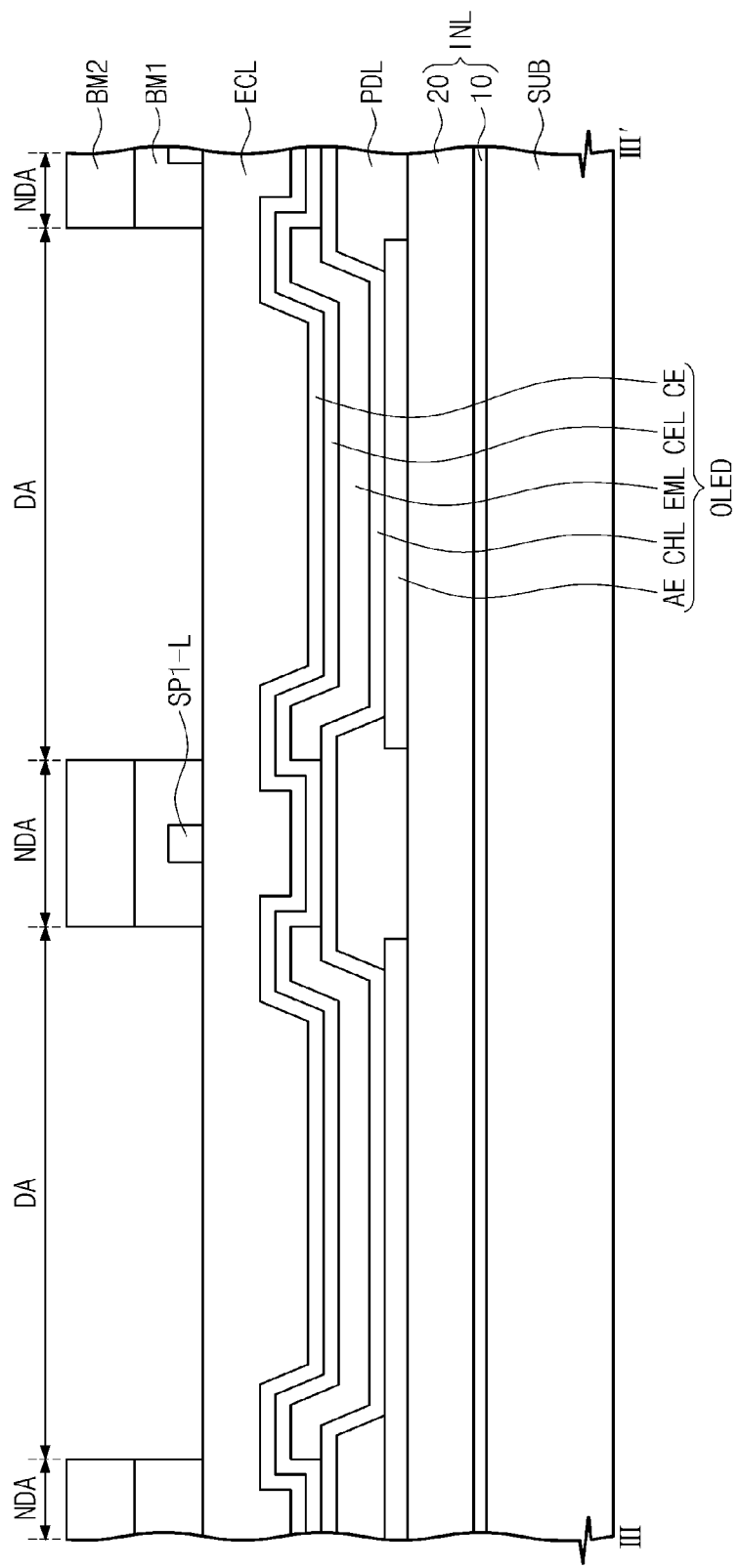
FIG. 11 is a cross-sectional view taken along a line III-III' of FIG. 10.

FIG. 10 is an enlarged plan view showing a portion AA of FIG. 9 and FIG. 11 is a cross-sectional view taken along a line III-III' of FIG. 10. FIG. 10 shows a portion of one first sensor part of the first sensor parts SP1.

Referring to FIG. 10, the first sensor parts SP1 overlap the non-light emitting area NDA disposed adjacent to the corresponding light emitting areas DA. The first sensor parts SP1 include a plurality of first horizontal portions SP1-L extending in the first direction DR1 and a plurality of vertical portions SP1-C extending in the second direction DR2.

The first horizontal portions SP1-L are connected to the first vertical portions SP1-C to form the openings SP1-OP. In other words, the first sensor parts SP1 have a mesh shape with the openings SP1-OP. The first sensor parts SP1 include a transparent conductive material, such as indium tin oxide, and a metallic material, such as copper, aluminum, etc.

Referring to FIG. 11, the first sensor parts SP1 are covered by the first light blocking layer BM1. The second light blocking layer BM2 is disposed on the first light blocking layer BM1, which overlaps the first sensor parts SP1.

Figure 12:
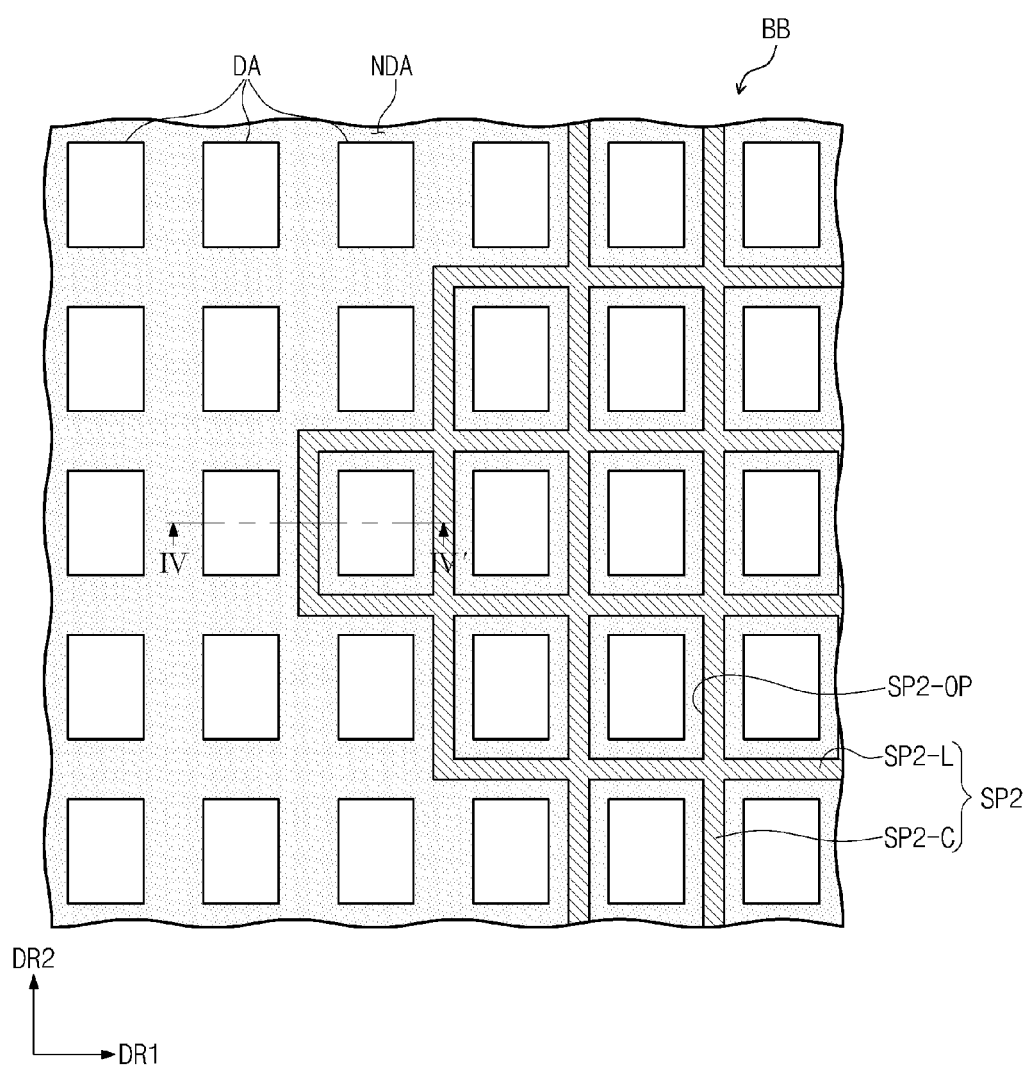
FIG. 12 is an enlarged plan view showing a portion BB of FIG. 9.
Figure 13:
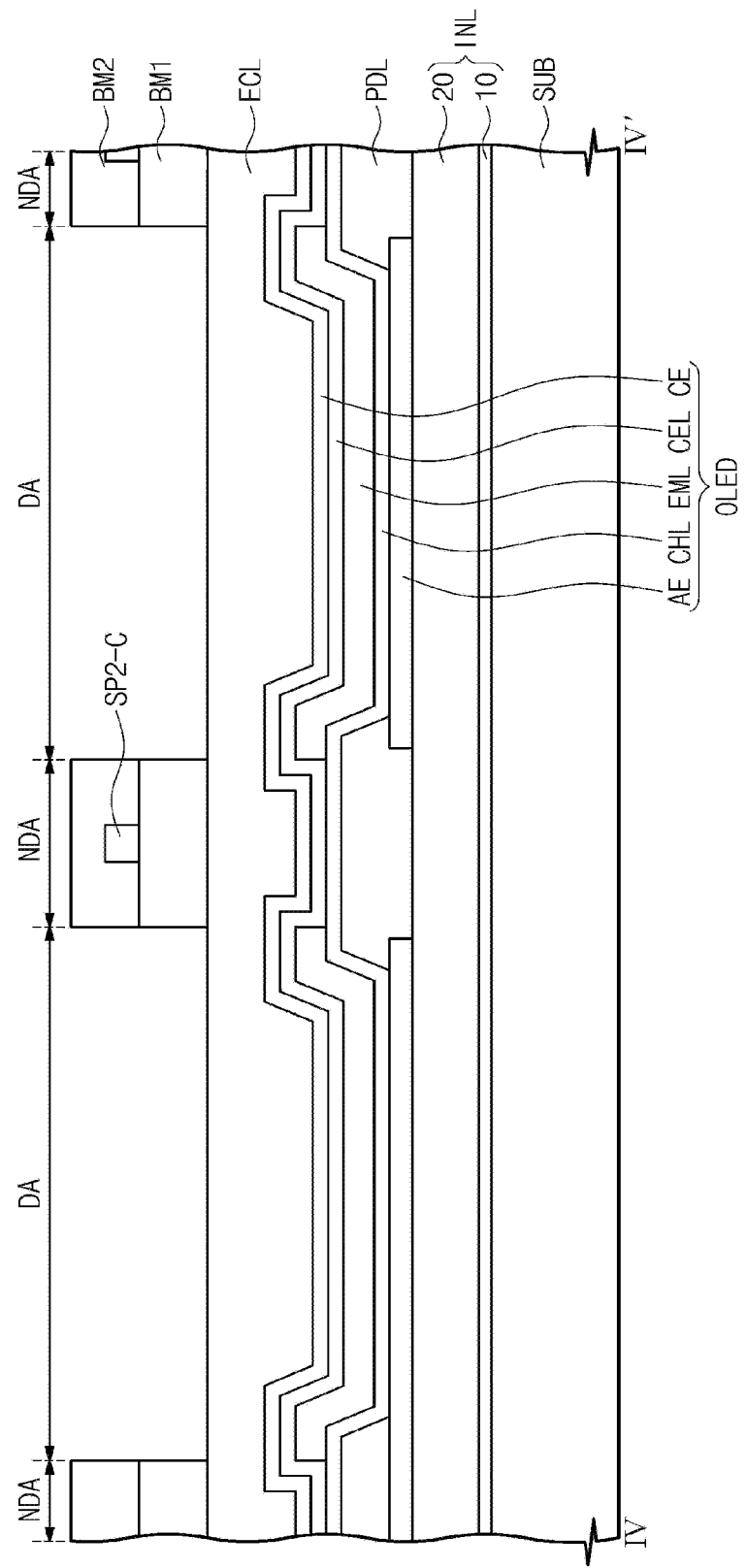
FIG. 13 is a cross-sectional view taken along a line IV-IV' of FIG. 12.

FIG. 12 is an enlarged plan view showing a portion BB of FIG. 9 and FIG. 13 is a cross-sectional view taken along a line IV-IV' of FIG. 12.

Referring to FIG. 12, the second sensor parts SP2 overlap the non-light emitting area NDA disposed adjacent to the corresponding light emitting areas DA. The second sensor parts SP2 may include a plurality of second horizontal portions SP2-L and a plurality of vertical portions SP2-C. The second horizontal portions SP2-L are connected to the second vertical portions SP2-C to form the openings SP2-OP.

In other words, the second sensor parts SP2 have a grid shape with the openings SP2-OP. The second sensor parts SP2 may include a transparent conductive material, such as indium tin oxide, or a metallic material, such as copper, aluminum, etc.

Referring to FIG. 13, the second sensor parts SP2 are disposed on the first light blocking layer BM1. The second sensor parts SP2 are covered by the second light blocking layer BM2 disposed on the first light blocking layer BM1.

Figure 14:
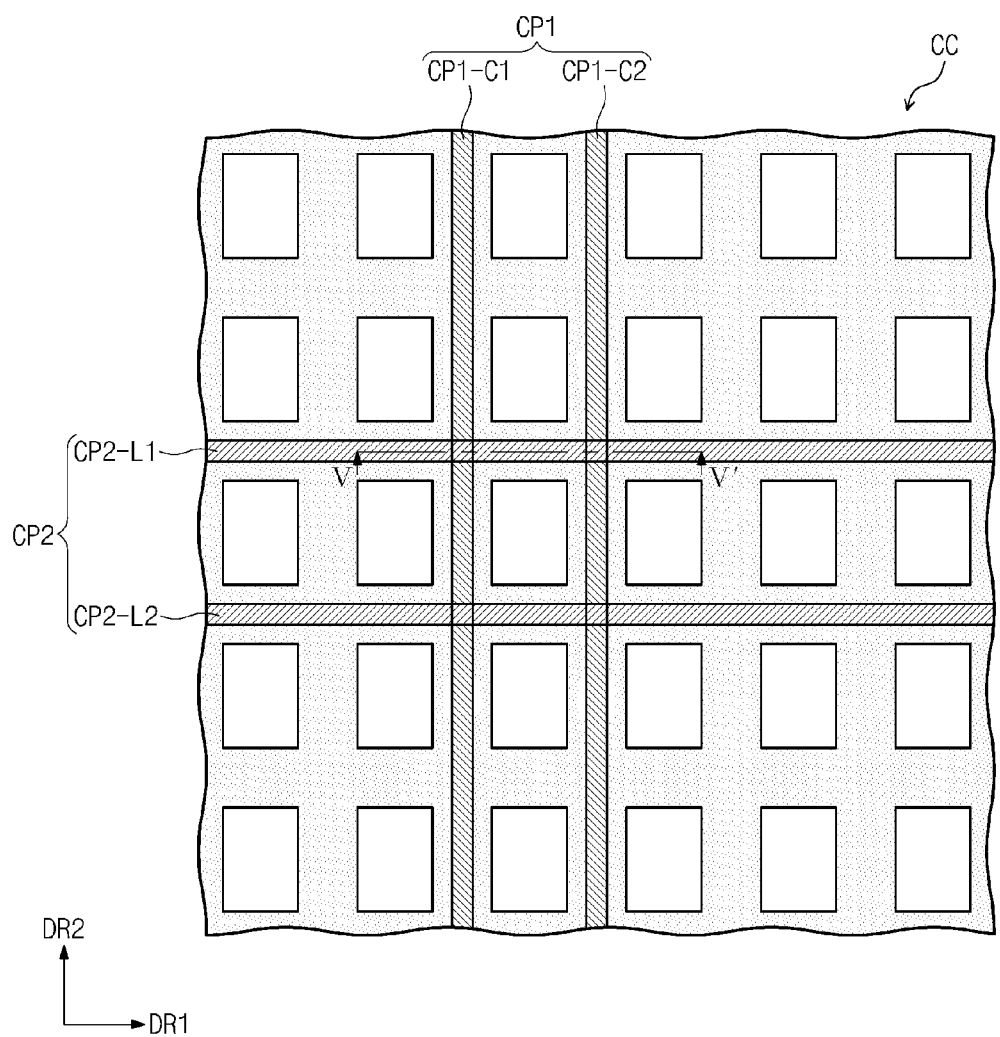
FIG. 14 is a plan view showing a portion CC of FIG. 9.
Figure 15:
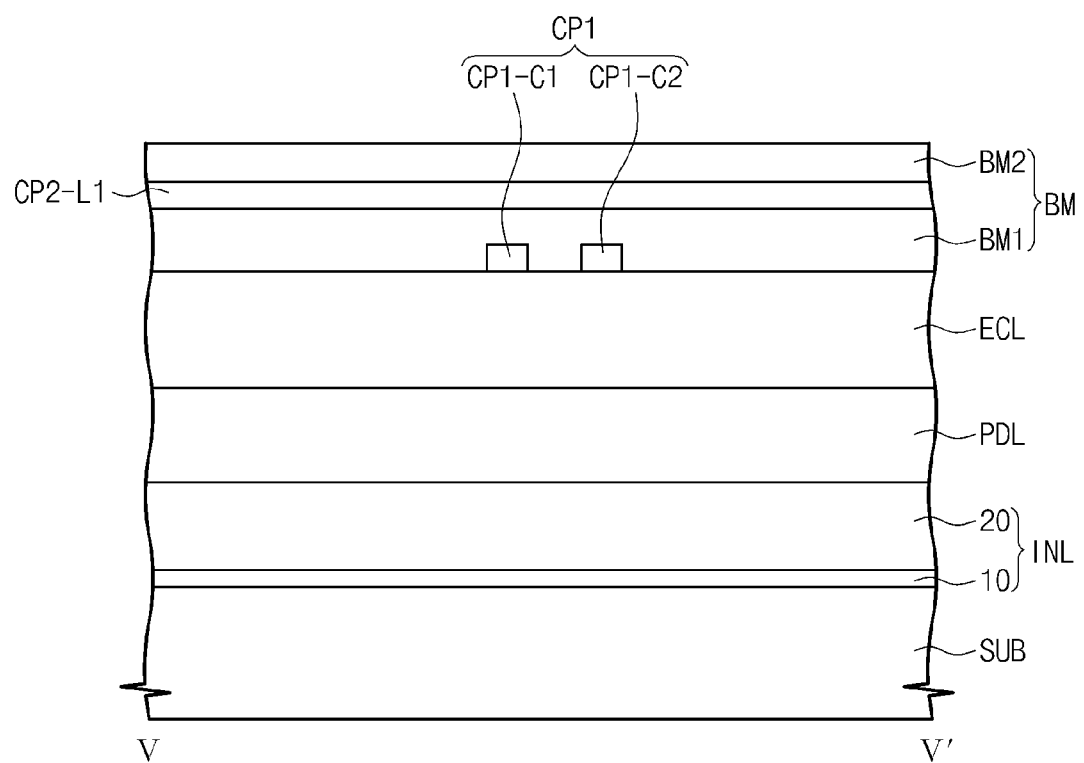
FIG. 15 is a cross-sectional view taken along a line V-V' of FIG. 14.

FIG. 14 is a plan view showing a portion CC of FIG. 9 and FIG. 15 is a cross-sectional view taken along a line V-V' of FIG. 14.

Referring to FIGS. 14 and 15, the first connection part CP1 may include two vertical parts CP1-C1 and CP1-C2 disposed on the sealing layer ECL. The second connection part CP2 may include two horizontal parts CP2-L1 and CP2-L2 disposed on the first light blocking layer BM1. The first connection part CP1 may include the same material as that of the first sensor parts SP1 and the second connection part CP2 may include the same material as that of the second sensor parts SP2. Although not shown in figures, the first connection part CP1 may further include horizontal portions overlapping the non-light emitting area NDA connecting the two vertical portions CP1-C1 and CP1-C2. That is, the first and second connection parts CP1 and CP2 may have a grid shape.

Figure 16:
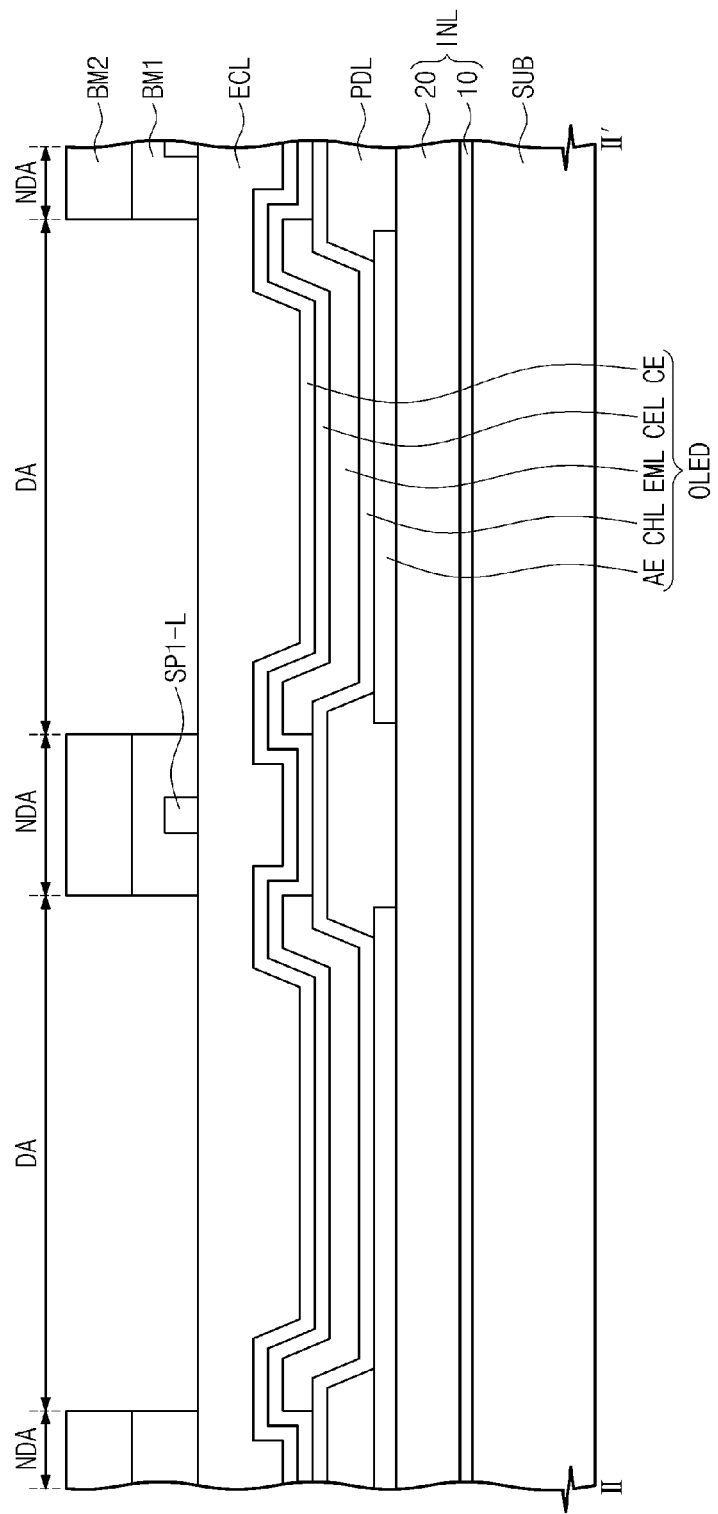
FIG. 16 is a cross-sectional view showing a first touch electrode according to an exemplary embodiment of the present invention.
Figure 17:
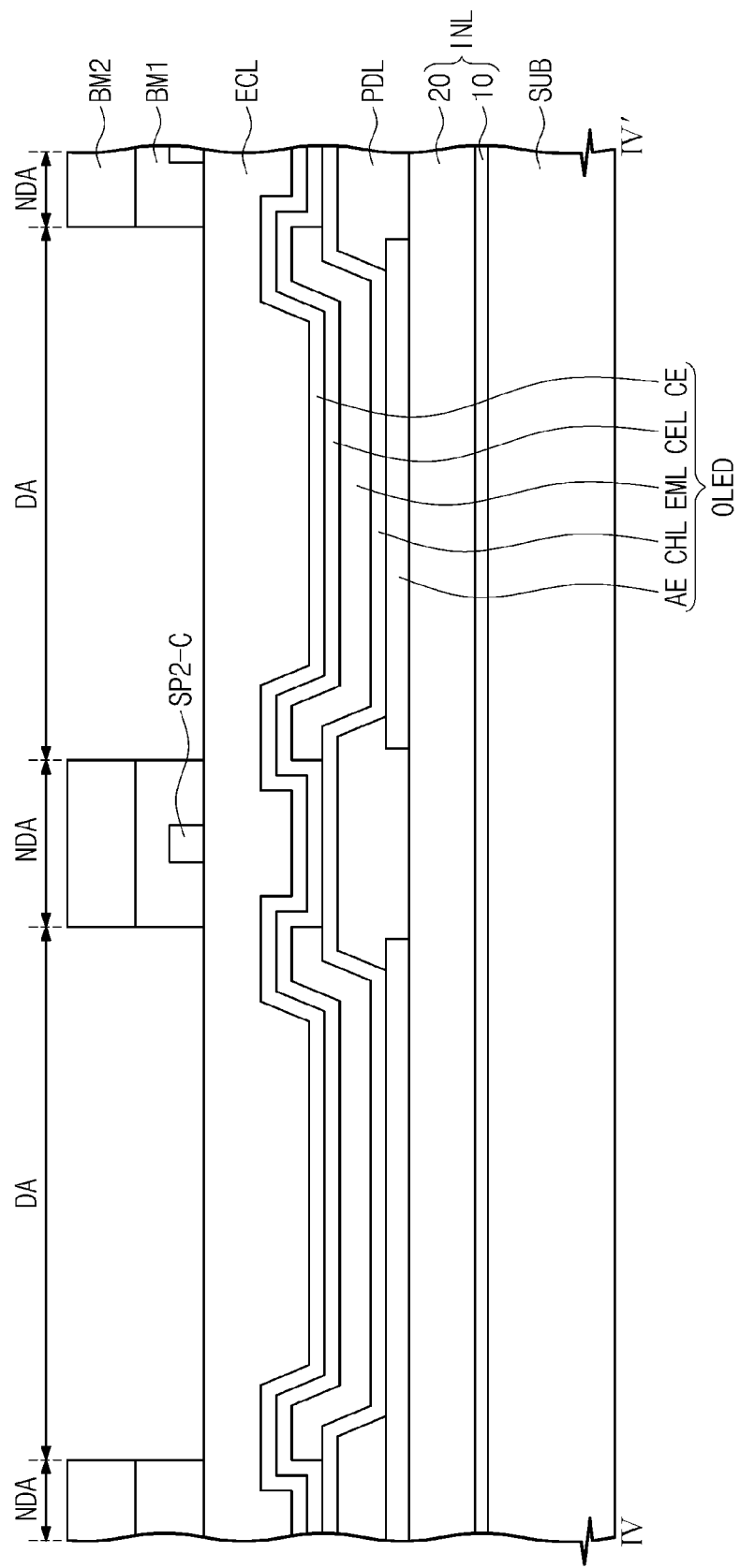
FIG. 17 is a cross-sectional view showing a second touch electrode according to an exemplary embodiment of the present invention.

FIG. 16 is a cross-sectional view showing a first touch electrode according to an exemplary embodiment of the present disclosure and FIG. 17 is a cross-sectional view showing a second touch electrode according to an exemplary embodiment of the present disclosure. FIGS. 16 and 17 respectively correspond to FIGS. 11 and 13.

According to the present exemplary embodiment, a portion of the first touch electrodes TE1-1 to TE1-$p$ and a portion of the second touch electrodes TE2-1 to TE2-$q$ may be disposed on the same layer. The second sensor parts SP2 of the second touch electrodes TE2-1 to TE2-$q$ may be disposed on the same layer as the first touch electrodes TE1-1 to TE1-$p$.

In this case, the first touch electrodes TE1-1 to TE1-$p$ and the second sensor parts SP2 may include the first conductive layer CL1 shown in FIG. 7. The second connection parts CP2 and the second touch electrodes TE2-1 to TE2-$q$ may include the second conductive layer CL2 shown in FIG. 7.

As shown in FIGS. 16 and 17, the first horizontal portion SP1-L of the first sensor parts SP1 and the second vertical portion SP2-C of the second sensor parts SP2 are disposed on the sealing layer ECL. The first horizontal portion SP1-L and the second vertical portion SP2-C are covered by the first light blocking layer BM1.

Figure 18:
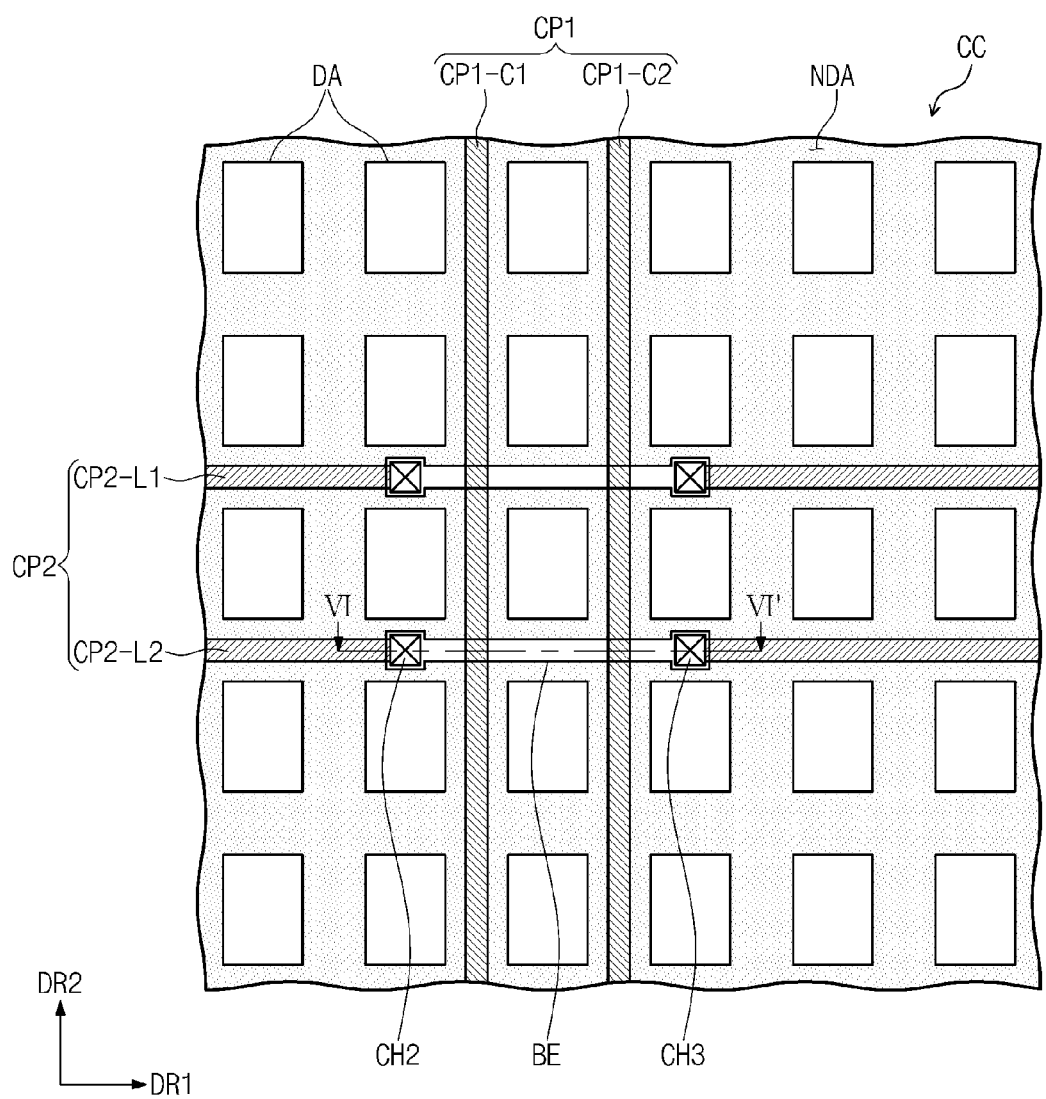
FIG. 18 is an enlarged plan view showing a cross-section between the first touch electrode and the second touch electrode.
Figure 19:
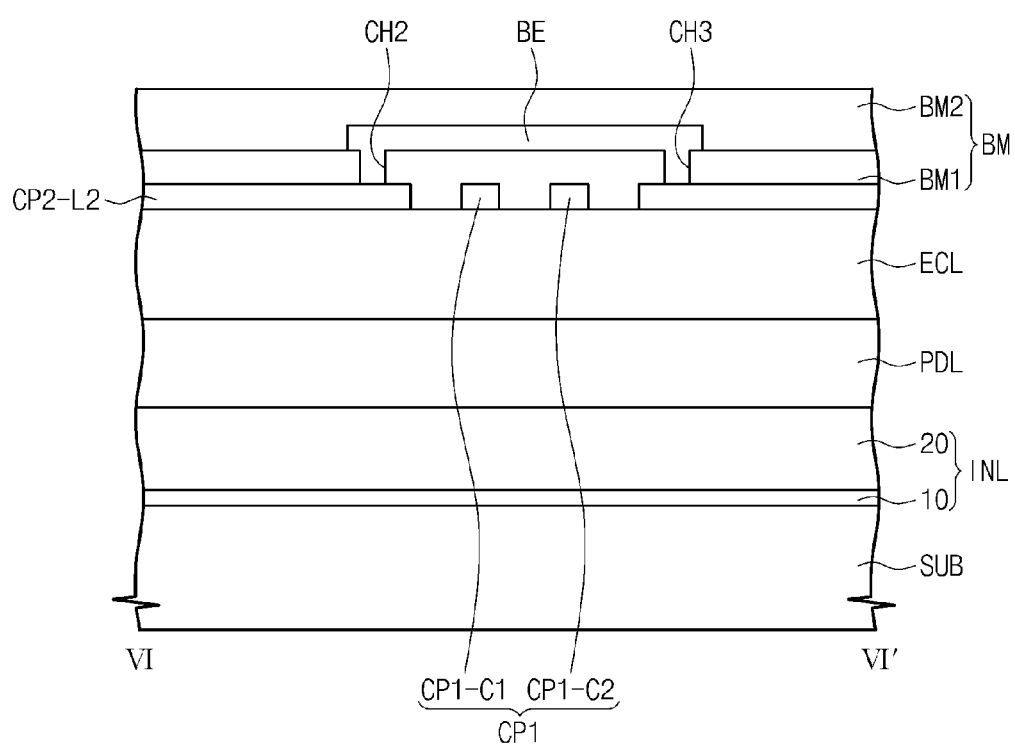
FIG. 19 is a cross-sectional view taken along a line VI-VI' of FIG. 18.

FIG. 18 is an enlarged plan view showing a cross-section between the first touch electrode and the second touch electrode and FIG. 19 is a cross-sectional view taken along a line VI-VI' of FIG. 18.

Referring to FIGS. 18 and 19, the first connection part CP1 includes two vertical parts CP1-C1 and CP1-C2 disposed on the sealing layer ECL. The second connection part CP2 includes two horizontal portions CP2-L1 and CP2-L2 disposed on the sealing layer ECL. The first light blocking layer BM1 is disposed on the sealing layer ECL to cover the first connection part CP1. The first light blocking layer BM1 partially covers the second connection part CP2.

The second connection part CP2 includes a bridge BE disposed on the first light blocking layer BM1. The second connection part CP2 may be open in an area in which the second connection part CP2 crosses the first connection part CP1. The bridge BE connects the portions of the second connection part CP2, which are disconnected from each other, through a second contact hole CH2 and a third contact hole CH3, which are formed through the first light blocking layer BM1.

According to another exemplary embodiment, the first connection part CP1 and the second connection part CP2 may be disposed on the first light blocking layer BM1 and the bridge BE may be disposed on the sealing layer ECL. The first light blocking layer BM1 may cover the bridge BE.

As shown in FIGS. 16 to 19, the electrostatic capacitive type touch panel, which includes the first sensor parts SP1 and the second sensor parts SP2 disposed on the same layer as the first sensor parts SP1, may calculate the coordinate information of the input point PP using a self-capacitance method.

Figure 20A:
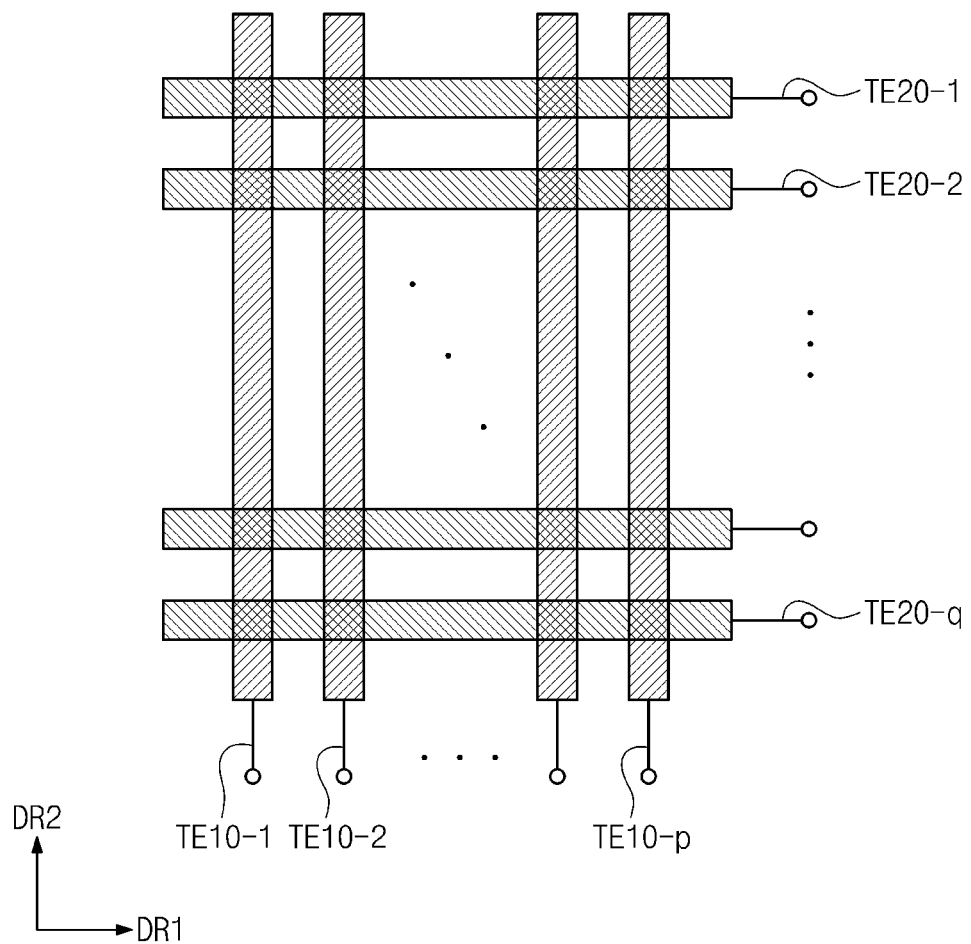
FIGS. 20A and 20B are plan views showing touch panels according to an exemplary embodiment of the present invention.
Figure 20B:
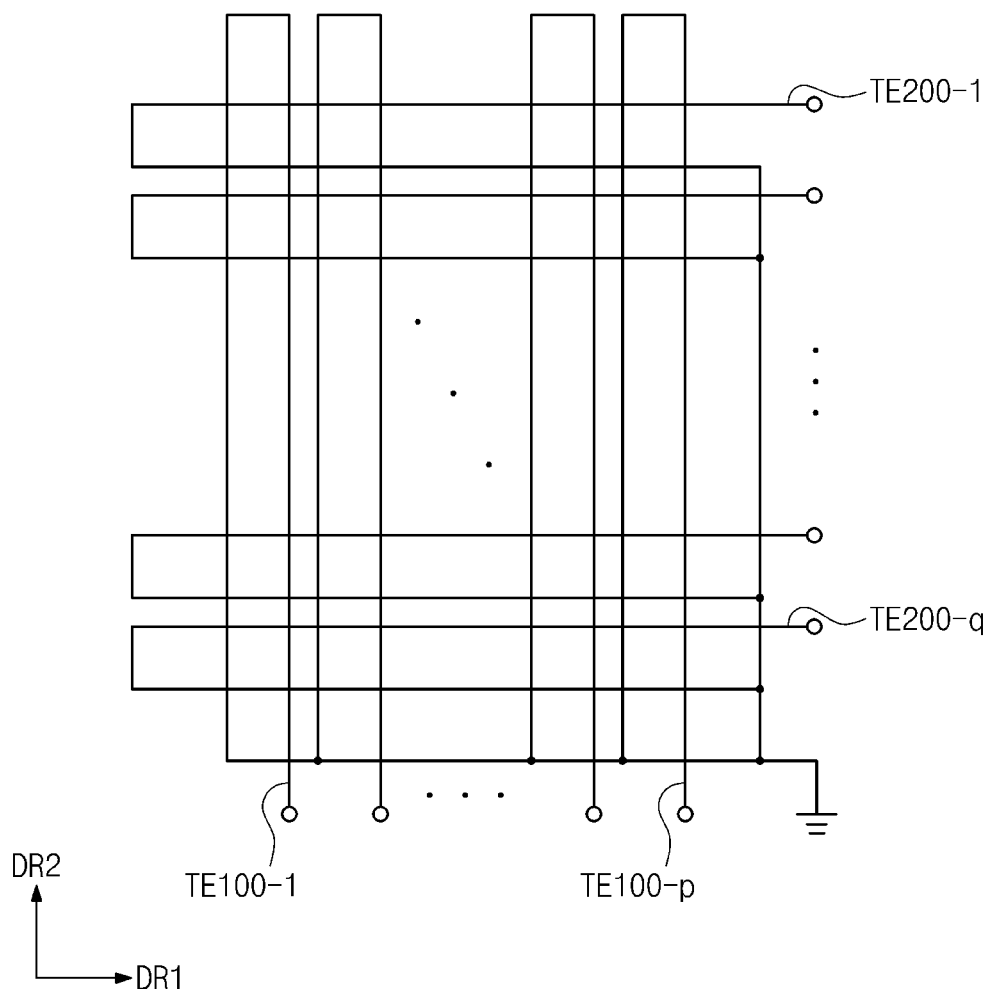

FIGS. 20A and 20B are plan views showing touch panels according to an exemplary embodiment of the present disclosure.

Referring to FIG. 20A, first touch electrodes TE10-1 to TE10-$p$ and second touch electrodes TE20-1 to TE20-$q$ have a bar shape in the electrostatic capacitive type touch panel, and the first touch electrodes TE10-1 to TE10-$p$ cross the second touch electrodes TE20-1 to TE20-$q$. The first touch electrodes TE10-1 to TE10-$p$ may be disposed on a different layer from the second touch electrodes TE20-1 to TE20-$q$, or a portion of the first touch electrodes TE10-1 to TE10-$p$ may be disposed on a different layer from a portion of the second touch electrodes TE20-1 to TE20-$q$. In addition, the first touch electrodes TE10-1 to TE10-$p$ may be disposed on a different layer from the second touch electrodes TE20-1 to TE20-$q$ in the crossing area.

Referring to FIG. 20B, the electromagnetic induction type touch panel includes first touch coils TE100-1 to TE100-$p$ and second touch coils TE200-1 to TE200-$q$. The first touch coils TE100-1 to TE100-$p$ are disposed on a different layer from the second touch coils TE200-1 to TE200-$q$, or a portion of the first touch coils TE100-1 to TE100-$p$ is disposed on a different layer from a portion of the second touch coils TE200-1 to TE200-$q$. In addition, the first touch coils TE100-1 to TE100-$p$ may be disposed on a different layer from the second touch coils TE200-1 to TE200-$q$ in the crossing area.

Figure 21:
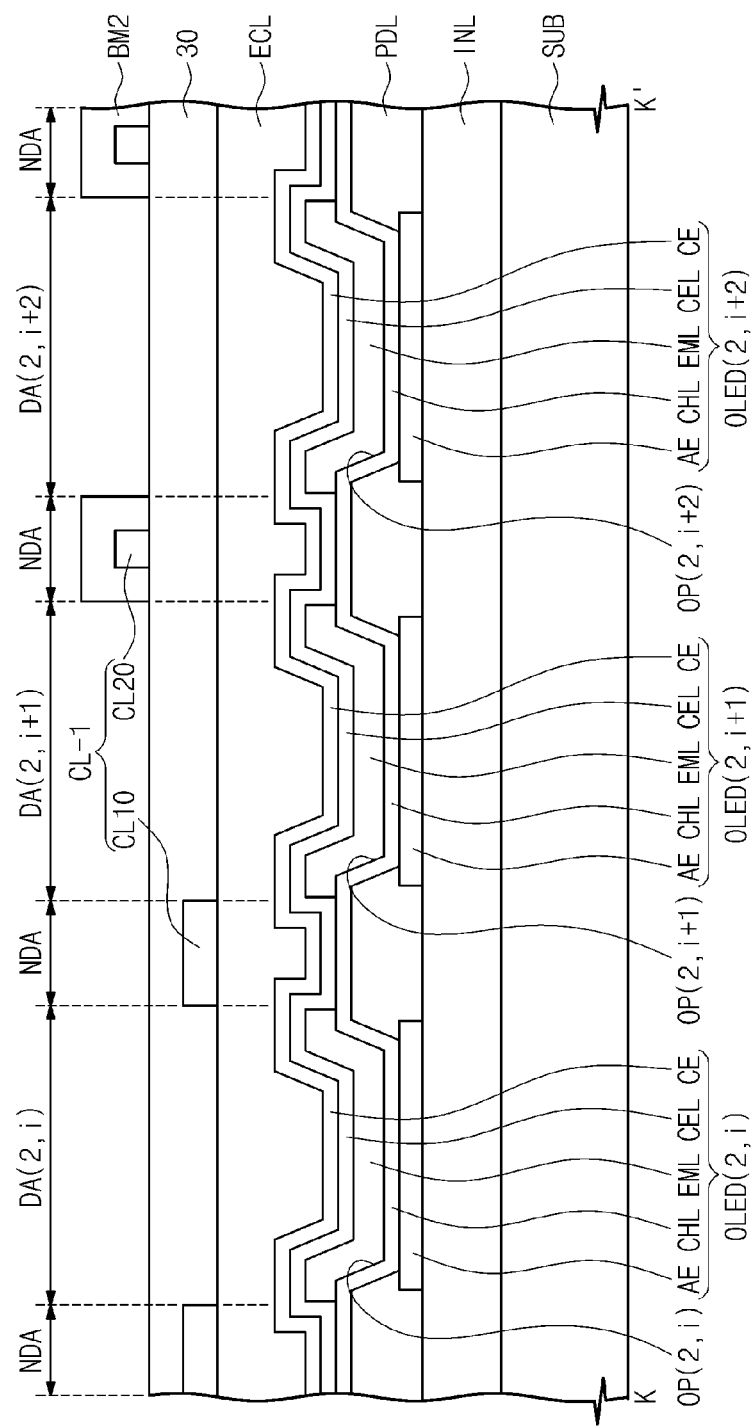
FIG. 21 is a cross-sectional view showing a portion of an organic light emitting display device taken along a line K-K' of FIG. 2, according to an exemplary embodiment of the present invention.

FIG. 21 is a cross-sectional view showing a portion of an organic light emitting display device according to an exemplary embodiment of the present disclosure. In FIG. 21, the same reference numerals denote the same elements in FIGS. 1 to 20, and thus detailed descriptions of the same elements will be omitted.

Referring to FIG. 21, a conductive layer CL-1 includes a first conductive layer CL10 and a second conductive layer CL20, which are disposed on different layers. The first conductive layer CL10 is disposed to overlap with the non-light emitting area NDA. The first conductive layer CL10 forms at least one of the first touch electrodes TE1-1 to TE1-$p$ (refer to FIG. 8) and the second touch electrodes TE2-1 to TE2-$q$ (refer to FIG. 8).

The first conductive layer CL10 includes a conductive light blocking material. The conductive light blocking material may include a conductive material having a low reflectance, for example, at least one of chromium oxide, chromium nitride, titanium oxide, titanium nitride, and an alloy thereof.

A third insulating layer 30 may be disposed on the sealing layer ECL to cover the first conductive layer CL10. The third insulating layer 30 includes a transparent insulating material to transmit the light. The third insulating layer 30 may overlap the non-light emitting area NDA and the light emitting areas DA(2,i), DA(2,i+1), and DA(2,i+2).

According to the present exemplary embodiment, the first light blocking layer BM1 shown in FIG. 7 may be omitted. Since the third insulating layer is not patterned, a misalignment does not occur.

The second conductive layer CL20 is disposed on the third insulating layer 30 to overlap with the non-light emitting area NDA. The second conductive layer CL20 may include a conductive material different from that of the first conductive layer CL10. The conductive material for the second conductive layer CL20 may be, for example, a metallic material, such as copper or aluminum. The second conductive layer CL20 may include the second sensor parts SP2 as shown in FIG. 13 or may include the bridge BE as shown in FIG. 19.

The second light blocking layer BM2 is disposed on the third insulating layer 30, covering the second conductive layer CL20. The second light blocking layer BM2 overlaps the non-light emitting area NDA.

According to another embodiment, the second conductive layer CL20 may include the conductive light blocking material. In this case, the second light blocking layer BM2 may be omitted.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An organic light emitting display device, comprising:
   an organic light emitting display panel comprising:
   a base substrate comprising light emitting areas and a non-light emitting area disposed adjacent to the light emitting areas;
   organic light emitting devices disposed to correspond to the light emitting areas;
   a sealing layer disposed on the organic light emitting devices overlapping the light emitting area and the non-light emitting area such that the organic light emitting devices are disposed between the sealing layer and the base substrate; and
   a touch panel comprising:
   first touch electrodes configured to receive scan signals;
   second touch electrodes crossing the first touch electrodes and configured to output sensing signals; and
   a first light blocking layer insulating the first touch electrodes and the second touch electrodes, and disposed between the first touch electrodes and the second touch electrodes, wherein
   the first touch electrodes and the first light blocking layer are disposed directly on the sealing layer overlapping the non-light emitting area and the second touch electrodes are disposed on the sealing layer overlapping the non-light emitting area.

2. The organic light emitting display device of claim 1, wherein a portion of the second touch electrodes is disposed on the first light blocking layer.

3. The organic light emitting display device of claim 2, wherein:
   the first touch electrodes surround a first portion of the light emitting areas and define openings corresponding to the first portion of the light emitting areas, and
   the second touch electrodes surround a second portion of the light emitting areas and define openings corresponding to the second portion of the light emitting areas.

4. The organic light emitting display device of claim 2, wherein the touch panel further comprises a second light blocking layer disposed on the first light blocking layer, the second light blocking layer covering the portion of the second touch electrodes disposed on the first light blocking layer.

5. The organic light emitting display device of claim 1, wherein the first touch electrodes are extended in a first direction and arranged in a second direction crossing the first direction and the second touch electrodes are extended in the second direction and arranged in the first direction.

6. The organic light emitting display device of claim 5, wherein each of the first touch electrodes comprises first sensor parts arranged in the first direction and first connection parts each electrically connecting at least two adjacent first sensor parts, and each of the second touch electrodes comprises second sensor parts arranged in the second direction and second connection parts each electrically connecting at least two adjacent second sensor parts.

7. The organic light emitting display device of claim 6, wherein the first sensor parts and the second sensor parts are disposed on the sealing layer,
   portions of the second connection parts are disposed on the first light blocking layer, and
   the portions of the second connection parts that are disposed on the first light blocking layer are insulated from the first connection parts and cross the first connection parts.

8. The organic light emitting display device of claim 7, wherein the first light blocking layer is disposed on the first sensor parts and the second sensor parts.

9. The organic light emitting display device of claim 8, wherein
   each of the second connection parts electrically connects the two adjacent second sensor parts through contact holes formed in the first light blocking layer.

10. The organic light emitting display device of claim 8, wherein the second connection parts are exposed through the first light blocking layer, and the touch panel further comprises a second light blocking layer disposed on the first light blocking layer, the second light blocking layer covering the second connection parts exposed through the first light blocking layer.

11. An organic light emitting display device, comprising:
    an organic light emitting display panel comprising:
    a base substrate comprising light emitting areas and a non-light emitting area disposed adjacent to the light emitting areas;
    organic light emitting devices disposed to respectively correspond to the light emitting areas; and
    a sealing layer covering the organic light emitting devices; and
    a touch panel comprising:
    first touch electrodes disposed directly on the sealing layer and configured to receive scan signals;
    second touch electrodes crossing the first touch electrodes and configured to output sensing signals;
    an insulating layer disposed directly on the sealing layer and covering the first touch electrodes; and
    a light blocking layer disposed on the insulating layer, covering the second touch electrodes, and comprising an insulating light blocking material,
    wherein the first touch electrodes and the second touch electrodes are disposed on the sealing layer overlapping with the non-light emitting area, at least one of the first touch electrodes and the second touch electrodes comprises a conductive light blocking material, and a width of the first touch electrodes in a first direction is equal to a distance between two adjacent light emitting areas in the first direction.

12. The organic light emitting display device of claim 11, wherein the conductive light blocking material comprises at least one of a chromium oxide, a chromium nitride, a titanium oxide, a titanium nitride, and an alloy thereof.

13. The organic light emitting display device of claim 11, wherein the first touch electrodes are disposed on a layer different from a layer on which the second touch electrodes are disposed.

14. The organic light emitting display device of claim 13, wherein the first touch electrodes comprise the conductive light blocking material, the second touch electrodes comprise a conductive reflective material.

15. The organic light emitting display device of claim 11, wherein the first touch electrodes and the second touch electrodes comprise the conductive light blocking material.

16. The organic light emitting display device of claim 15, wherein each of the first touch electrodes comprises first sensor parts arranged in the first direction and first connection parts each connecting at least two adjacent first sensor parts,
- each of the second touch electrodes comprises second sensor parts arranged in a second direction crossing the first direction and second connection parts crossing the first connection parts, and
- each of the second connection parts electrically connects at least two adjacent second sensor parts.

17. The organic light emitting display device of claim 16, wherein the first sensor parts and the second sensor parts are disposed on a same layer, and
- the first connection parts are disposed on a layer different from a layer on which the second connection parts are disposed, and
- the first connection parts cross the second connection parts and are insulated from the second connection parts.

18. The organic light emitting display device of claim 17, wherein the first connection parts are disposed on a same layer as the first sensor parts, and
- each of the second connection parts electrically connects the two adjacent second sensor parts through contact holes formed in the insulating layer.

19. The organic light emitting display device of claim 11, wherein a width of the light blocking layer in the second direction is equal to a distance between two adjacent light emitting areas in the second direction.

* * * * *